United States Patent
Stiles et al.

(10) Patent No.: US 7,234,210 B2
(45) Date of Patent: Jun. 26, 2007

(54) POST ATTACHMENT DEVICE

(75) Inventors: Mark A. Stiles, Atlanta, GA (US);
Alan L. Wilcox, Atlanta, GA (US);
James R. Downing, Atlanta, GA (US);
Samuel Vincent Tidwell, Sr.,
Dunwoody, GA (US); **Steve L.
Caldwell**, Snellville, GA (US)

(73) Assignee: Hubbard/Downing, Inc., Atlanta, GA (US)

( * ) Notice: Subject to any disclaimer, the term of this patent is extended or adjusted under 35 U.S.C. 154(b) by 136 days.

(21) Appl. No.: 11/121,448

(22) Filed: May 4, 2005

(65) Prior Publication Data

US 2005/0204457 A1    Sep. 22, 2005

Related U.S. Application Data

(63) Continuation-in-part of application No. 10/627,066, filed on Jul. 25, 2003, now Pat. No. 6,978,523.

(51) Int. Cl.
*A44B 11/25* (2006.01)

(52) U.S. Cl. .............................. 24/628; 24/701; 2/411; 2/425; 29/434

(58) Field of Classification Search ................. 24/701, 24/628, 666–668; 2/422, 416, 421, 425, 2/468, 411; 248/221.12, 222.41; 29/434
See application file for complete search history.

(56) References Cited

U.S. PATENT DOCUMENTS

| 988,558 | A | 4/1911 | England |
| 2,640,246 | A | 6/1953 | Shomber |
| 3,583,042 | A | 6/1971 | Ishizaka |
| 3,885,811 | A | 5/1975 | Takada |
| 3,925,822 | A | 12/1975 | Sawyer |
| 3,928,896 | A | 12/1975 | Puckett |
| 6,381,758 | B1 | 5/2002 | Roberts, II et al. |
| 6,729,643 | B1 | 5/2004 | Bassick et al. |
| 6,813,782 | B2 | 11/2004 | Kintzi et al. |
| 7,114,197 | B2 * | 10/2006 | Garneau et al. ............... 2/421 |

OTHER PUBLICATIONS

HANS—Head and Neck Support Owner's Manual.

* cited by examiner

*Primary Examiner*—James R. Brittain
(74) *Attorney, Agent, or Firm*—Ian C. McLeod; Steven E. Merritt

(57) ABSTRACT

A post attachment device for connecting a helmet to a head and neck support. The device includes a post anchor having a base, a button, a resilient member, a post, a retainer and a catch having a slot with a larger first section connected by a channel to a smaller second section. The button is positioned in an indention in the base with the resilient member positioned therebetween. The post extends through the button, the base and the helmet. The retainer is secured on the post adjacent the inner surface of the helmet. To secure the post attachment device, the catch is orientated over the post. The button is then pressed into the base while the catch is moved backwards to move the post into the second section of the slot.

25 Claims, 20 Drawing Sheets

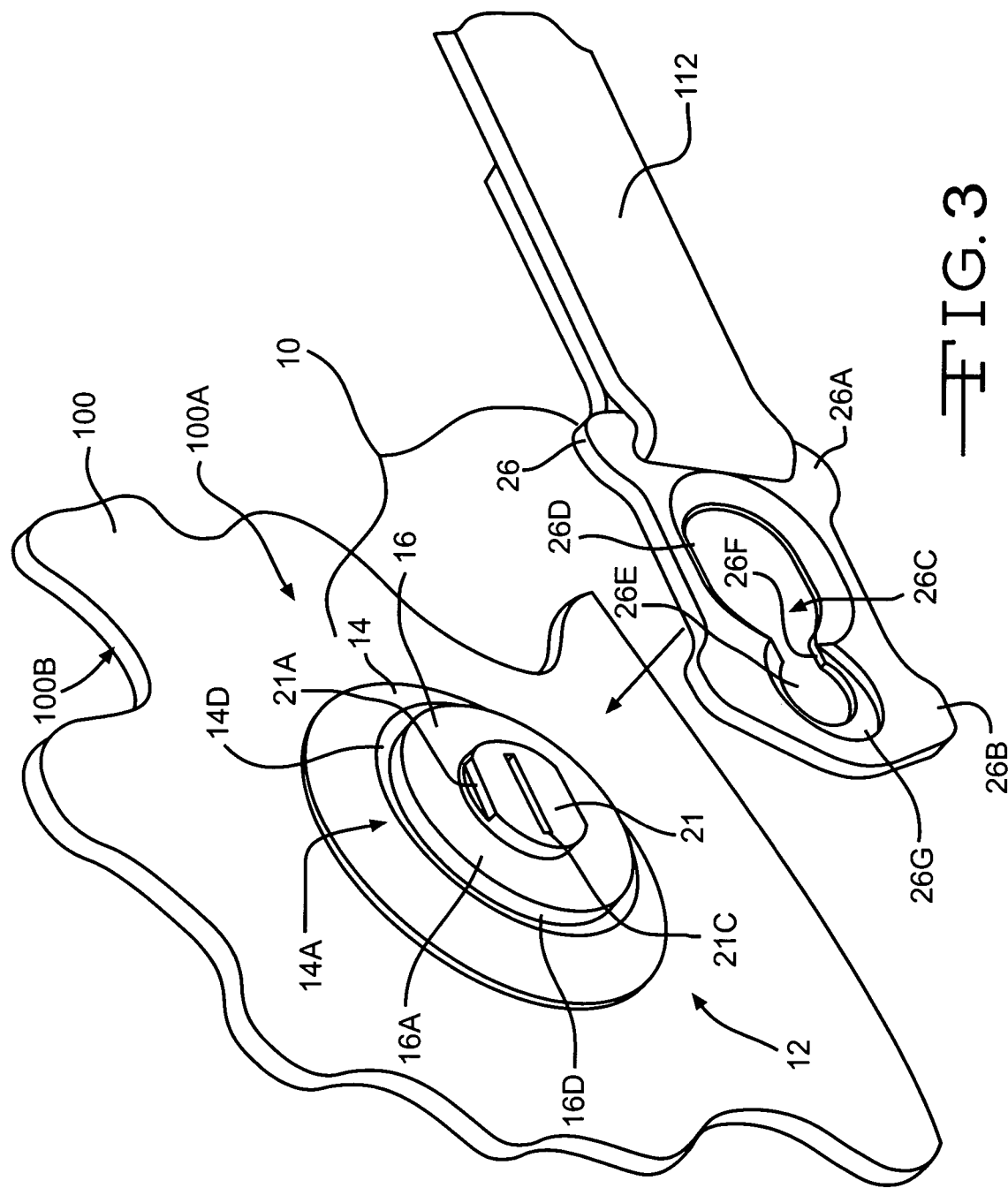

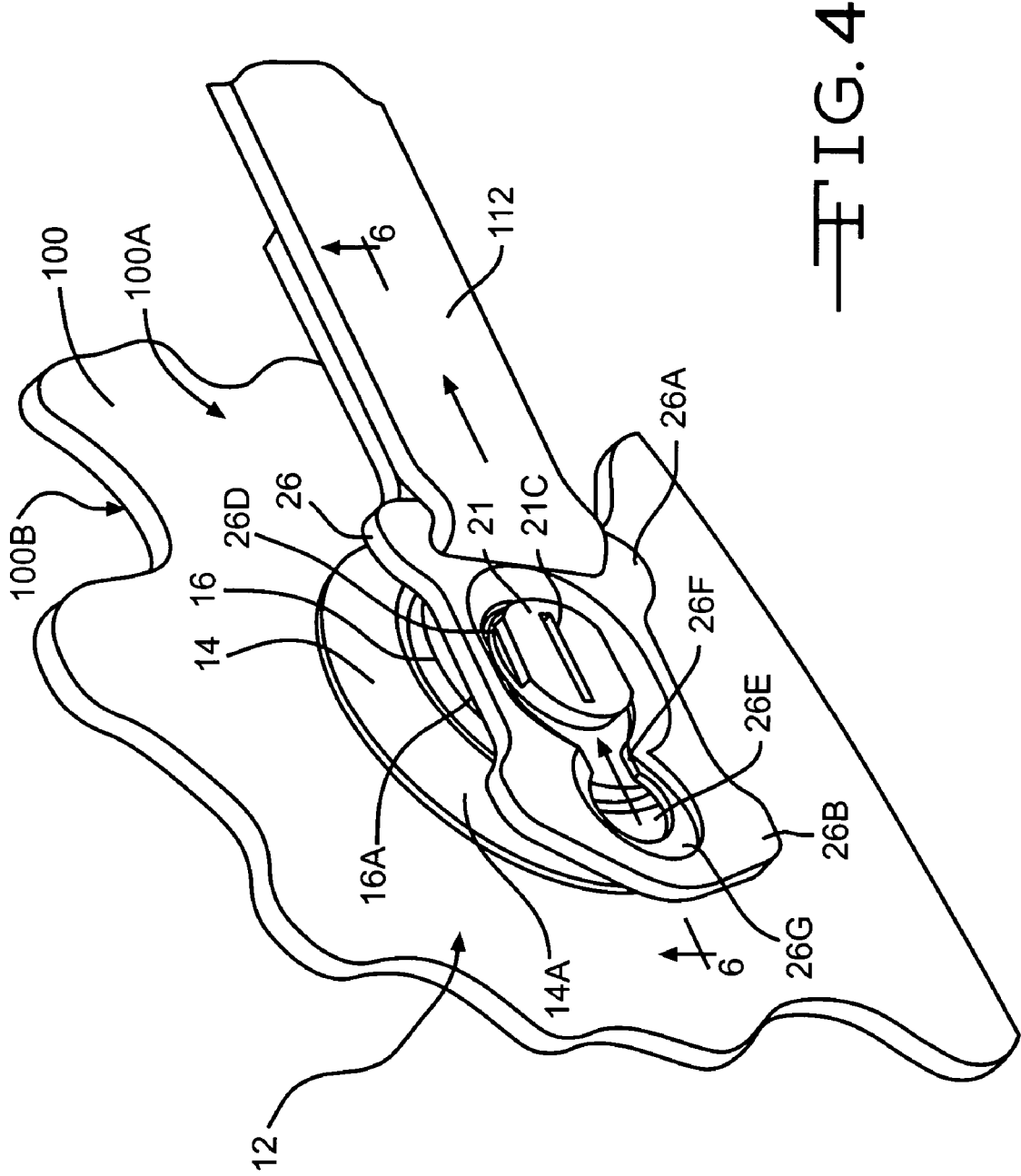

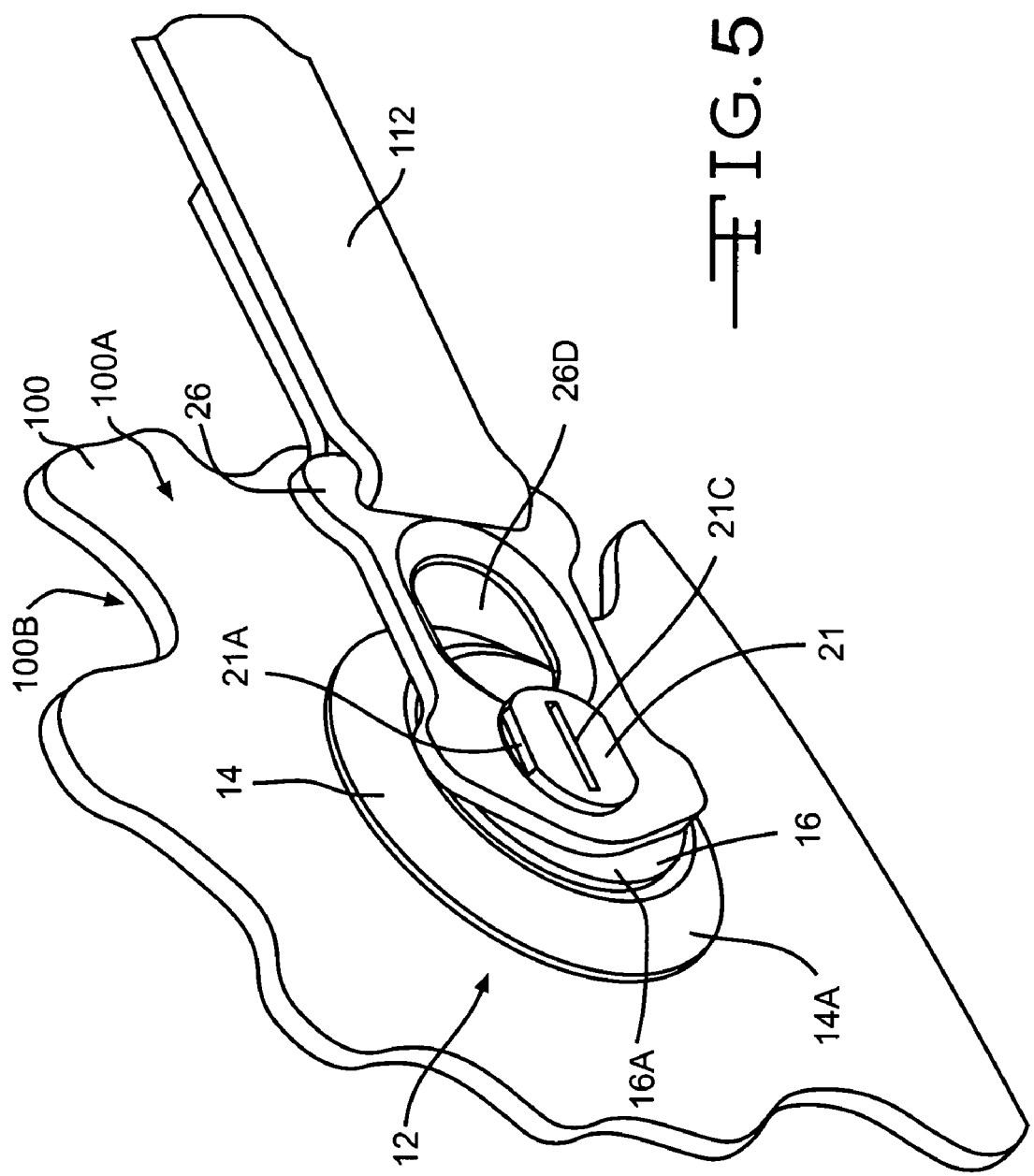

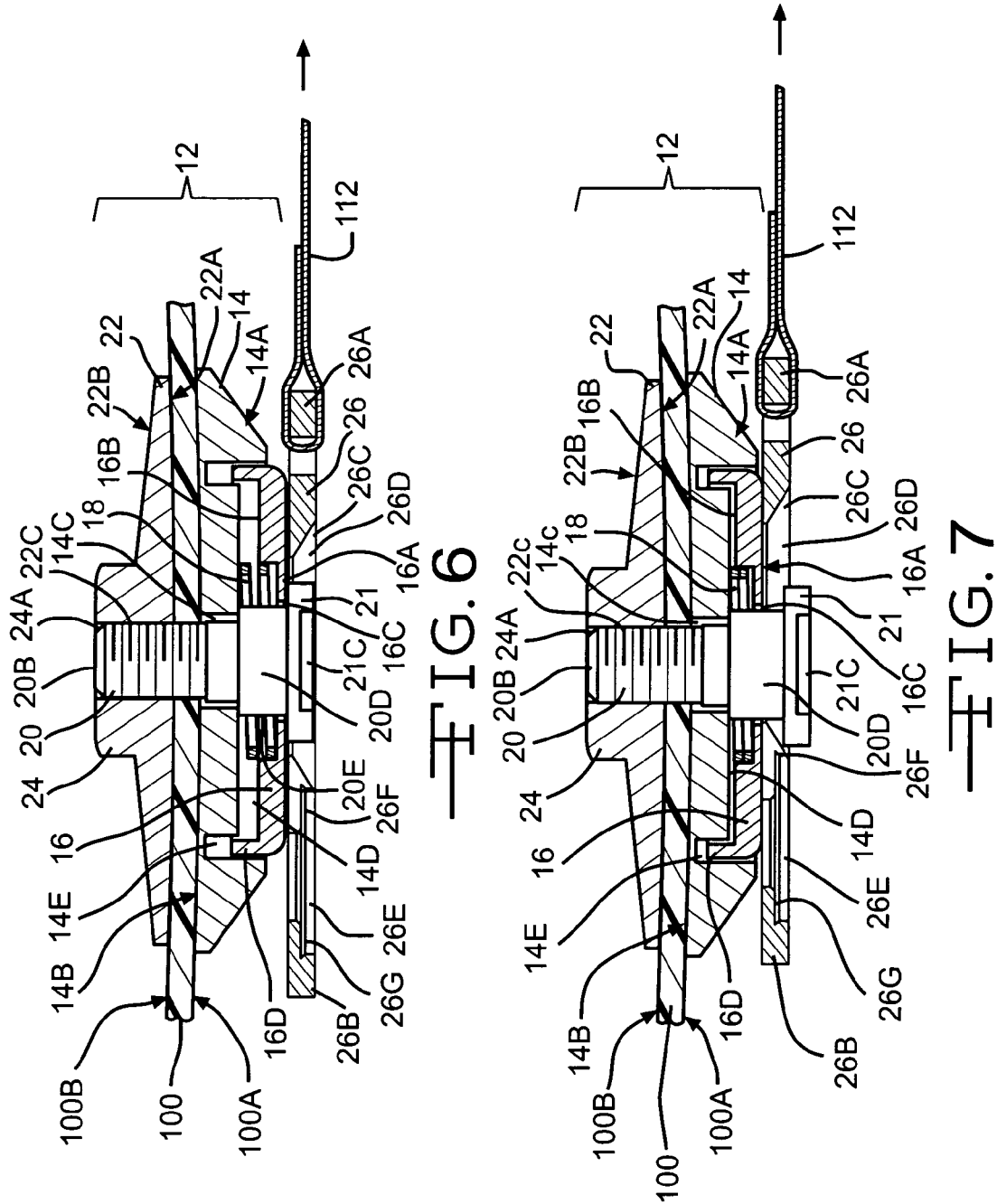

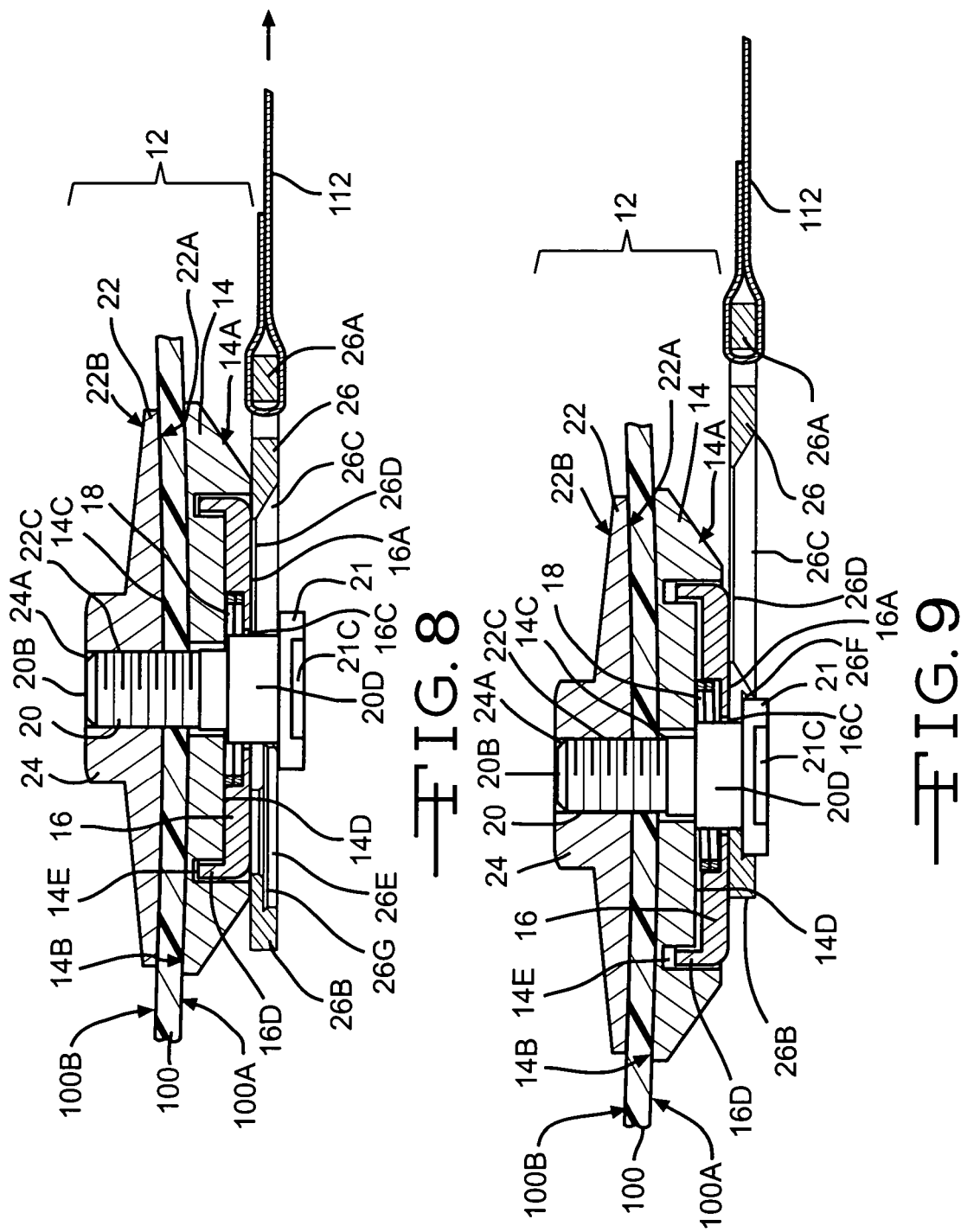

POST ATTACHMENT DEVICE

CROSS-REFERENCE TO RELATED APPLICATION(S)

This application is a continuation-in-part of application Ser. No. 10/627,066, filed Jul. 25, 2003 now U.S. Pat. No. 6,978,523.

STATEMENT REGARDING FEDERALLY SPONSORED RESEARCH OR DEVELOPMENT

Not Applicable

BACKGROUND OF THE INVENTION (1) Field of the Invention

The present invention relates to a post attachment device for securing a tether between a helmet and a head and neck support device. In particular, the present invention relates to a post attachment device which uses post anchors mounted on the helmet and a catch connected to the head and neck support device to secure the helmet to the head and neck support device during use and to limit rotation of the catch on the post anchors.

(2) Description of the Related Art

The related art has shown several systems for connecting a head and neck support or restraint device to a helmet. One (1) such known system includes a J-clip mounted on the helmet and a D-ring connected by a tether to the head and neck support device. The J-clip on the helmet has a flat, polished spring which deflects toward the helmet. To connect the D-ring to the J-clip, one (1) edge of the D-ring is pushed down onto the spring to deflect the spring or press the spring toward the helmet and create an opening into the J-clip. While deflecting the spring, the D-ring is moved towards the rear of the helmet. Once the D-ring is within the J-clip, the spring will snap back into the locked position securing the D-ring in the J-clip. To remove the D-ring from the J-clip, the D-ring is pulled toward the rear of the helmet while the spring is pressed down and deflected toward the helmet. While holding the spring down, the D-ring is slid forward and removed from the J-clip. One (1) disadvantage of the J-clip system is that it is difficult for the driver (user) to detach the J-clip without assistance. In addition, it is difficult for the user to attach the D-ring to the J-clip. It usually takes a user several attempts before succeeding in attaching the D-ring to the J-clip. In addition, the mounting of the J-clip to the helmet is complex and is usually done by the manufacturer.

Other systems of connecting helmets to a head and neck support system or a restraint are illustrated in U.S. Pat. No. 3,925,822 to Sawyer; U.S. Pat. No. 6,381,758 to Roberts, II et al.; U.S. Pat. No. 6,729,643 to Bassick et al. and U.S. Pat. No. 6,813,782 to Kintzi et al.

Sawyer shows a ring secured to a helmet and a snap hook for connecting to the ring. The snap hook is on a connecting strap which is connected to a shoulder strap of the safety harness.

Roberts, II et al. describes a head restraint system which includes a helmet and a pair of energy dissipating extendable restraining lanyards. The lanyards are connected to the helmet by connectors. In one (1) embodiment, the helmet has steel cable loops and the lanyards have metal clips such as carabiner clips which connect to the cable loops. In another embodiment, the lanyards have a hook which is received in a loop located on the side of the helmet. An actuating cable is connected to the hook to allow for quick release of the harness system.

Bassick et al. describes a neck support and head restraint device for helmeted drivers which has a pliable collar connected to the helmet by tethers. The tethers are detachably connected by buckles to opposite sides of the helmet.

Kintzi et al. describes a multi-point strap assembly which is fixedly attached to a racing suit and removably connected to the operator's helmet. A connector means includes a buckle and allows for releasable attachment of the straps to the helmet.

The related art has also shown various types of fasteners having a post and a catch or connector which has openings to accommodate the post to connect the catch and post together. Illustrative are U.S. Pat. No. 988,558 to England; U.S. Pat. No. 2,640,246 to Shomber; U.S. Pat. No. 3,583,042 to Ishizaka, U.S. Pat. No. 3,885,811 to Takada and U.S. Pat. No. 3,928,896 to Puckett.

England shows a fastener having a post with a head and an eyelet plate. The eyelet plate has two eyeholes, only one of the eyeholes being large enough for the head of the post to go through it. The neck joining the two eyeholes is narrower than the two eyeholes. A ring-like keeper is provided around the shank part of the post. The ring-like keeper is biased toward the head of the post by a spring supported in a cup fastened on the remote end of the post. To use the device, the eyelet plate is positioned so that the head of the post is in the larger eyehole. The eyelet plate is then pulled to move the post to the second, smaller eyehole. As the eyelet plate is being moved, wedges on the eyelet plate contact the post adjacent the head and force the eyelet plate inward pressing the ring-like keeper. When the eyelet piece (plate) has been pulled far enough to get its neck past the post, the post enters the smaller eyehole and the spring moves the ring-like keeper outward and forces the eyelet piece toward the head of the post. The spring and ring-like keeper lock the eyelet piece in position on the post.

Shomber describes a fastening device having a keyhole slotted socket member and a hanger stud member. The stud member includes a conical coil spring and a washer member which are preassembled before attachment to the supporting structure Ishizaka describes a fastener for fastening a strap to a camera. The fastener includes a mounting shaft and a connecting member having an opening designated by two curved portions. The mounting shaft has a retainer member mounted around the shaft. The retainer member is biased by a spring toward the head of the shaft. To connect the connecting member to the mounting shaft, the connecting member is positioned so that the head of the shaft is aligned with one of the curved portions of the opening. The connecting member is pushed against the retainer member and the connecting member is moved so that the shaft is moved into the other of the curved portions of the opening of the connecting member. When the shaft moves into the other of the curved portions of the opening, the retainer member returns to the original, uncompressed position. To release the connecting member from the shaft, the retainer member is pushed downward against the spring and the connecting member is displaced so that the shaft is in the first of the curved portions of the opening.

Takada describes a vehicle safety belt having a first and second coupling section. The first coupling section has a forward circular opening and a rear circular opening with a passageway in the form of a slot having paralleled side edges extending therebetween. The second coupling section has a coupling pin. In one (1) embodiment, the guide section of the coupling pin is an elongated, traverse cross-section with parallel side edges.

Puckett describes a fastener having a male portion which includes a stem and an enlargement such as a disc and a female portion including a plate with an enlarged opening with a narrow slot extending therefrom. The male portion is fixed to a piece of fabric by grommets positioned on opposite sides of the fabric.

There remains the need for an attachment device for connecting a head and neck support device to a helmet which can be easily connected and disconnected by the user, which is easy to mount on the helmet, which is robust and strong and which has limited rotation.

SUMMARY OF THE INVENTION

A post attachment device for connecting a helmet worn by a driver of a racing vehicle to a head and neck support device worn by the driver. The helmet is connected to the head and neck support device using a pair of post attachment devices. Each post attachment device includes a post anchor mounted on the helmet and a catch. The post attachment devices connect to tethers which extend between each side of the helmet and the sides of the head and neck support device adjacent each shoulder of the driver. The post anchor includes a base, a button, a resilient member, a post and a retainer. The base is configured to be mounted on the outer surface of the helmet aligned by a hole in the helmet. The base has a center opening which is aligned with the hole in the helmet. The front surface of the base has an indention within which is positioned the button. The resilient member is positioned between the back side of the button and the floor of the indention. The resilient member acts to bias the button away from the floor of the indention and away from the helmet. The button has an opening which aligns with the center opening in the base and the hole in the helmet. The post is inserted through the opening of the button, through the resilient member, through the center opening in the base and through the hole in the helmet. The post has a head at one end which is larger than the opening in the button so that the post can not extend through the button. The post has a connector section adjacent the head of the post. The connector section is smaller in size than the head and is able to fit through the opening of the button. However, the size of the connector section is greater than the center opening of the base so that the connector section is not able to extend through the center opening of the base. The connector section has a pair of opposed and parallel flat sections. The head of the post, in one (1) embodiment, has a pair of opposed and parallel flat sections which correspond and are parallel to the flat sections of the connector section. The head may also have a line which extends parallel to the flat sections of the connector section and can be used to identify the orientation of the connector section. A retainer is secured adjacent the inner surface of the helmet on the second end of the post. When the anchor post is fully secured on the helmet, the connector section is in contact with the base adjacent the center opening of the base so that the base and helmet are sandwiched between the connector section of the post and the retainer secured to the second end of the post.

The catch is connected to one end of a tether which is connected at the other end to the head and neck support device. The catch has an opening or a slot which extends between the ends of the catch. The slot has a larger first section adjacent one end of the catch which is connected by a channel to the smaller second section adjacent the other end of the catch.

To connect the catch to the post anchor, the catch is positioned over the post so that the head of the post is in the first section of the slot. The catch is then orientated so that the sides of the channel are parallel to the flat sections of the connector section of the post. In one (1) embodiment, the post is orientated so that the flat sections of the connector section are essentially parallel to the ground surface or essentially horizontal. The user can use the flat sections of the head or the line on the head to determine the orientation of the flat sections of the connector section. Once the catch is correctly orientated, the user pushes the catch inward toward the helmet while moving the catch backwards toward the back of the helmet. As the user pushes inward on the catch, the catch pushes inward on the button which presses the button into the indention of the base. The button is pressed inward until the connector section of the post extends beyond the button and the space between the front side of the button and the back surface of the head of the post is greater than a thickness of the catch adjacent the channel. The user presses inward on the catch while moving the catch toward the back of the helmet. As the catch is moved, the post moves from the first section of the slot through the channel to the second section of the slot. Due to the width of the channel and the shape of the connector section of the post, the post will only move through the channel when the flat sections of the connector section are parallel to the sides of the channel. Once the post is in the second section, the inward pressure on the catch is removed and the resilient member moves the button outward toward the back surface of the catch. When the post attachment device is fully attached, the catch around the perimeter of the second section of the slot is sandwiched and held between the front side of the button and the back surface of the head of the post. The catch can be provided with a recess around the perimeter of the second section which enables the head of the post to be securely seated on the catch in the second section of the slot. The size and shape of the connector section of the post and the size and shape of the second section of the slot may allow the catch to rotate or index on the post.

In some embodiments, the degree of rotation of the catch around the post is limited to reduce the twisting of the tethers and to allow ease of detachment of the catch from the post anchor. In one (1) embodiment, the catch is only limited in rotation under normal conditions; however, the catch will rotate beyond the preset limited degree of rotation when above normal torque or excessive loads are placed on the catch or tether. In one (1) embodiment, the head of the post has an extension or nose at one end which contacts the catch when the catch rotates on the post. In another embodiment, the catch has stops which contact the extension on the head of the post and prevent full rotation of the catch on the post. In still another embodiment, the base is provided with stops and the catch contacts the stops when the catch rotates on the post to prevent the catch from rotating beyond a preset position.

The substance and advantages of the present invention will become increasingly apparent by reference to the following drawings and the description.

BRIEF DESCRIPTION OF THE DRAWINGS

FIG. 3 is a perspective view of the post attachment device 10 in the disconnected position.

FIG. 4 is a perspective view of the post attachment device 10 prior to attachment.

FIG. 5 is a perspective view of the post attachment device 10 in the fully connected position.

FIG. 6 is a cross-sectional view of FIG. 4 along the line 6-6 showing the button 16 in the fully extended position.

FIG. 7 is a cross-sectional view of the post attachment device 10 showing the button 16 in the partially pressed position.

FIG. 8 is a cross-sectional view of the post attachment device 10 with the button 16 in the fully pressed position.

FIG. 9 is a cross-sectional view of the post attachment device 10 in the attached position.

DESCRIPTION OF PREFERRED EMBODIMENT(S)

Figure 1:
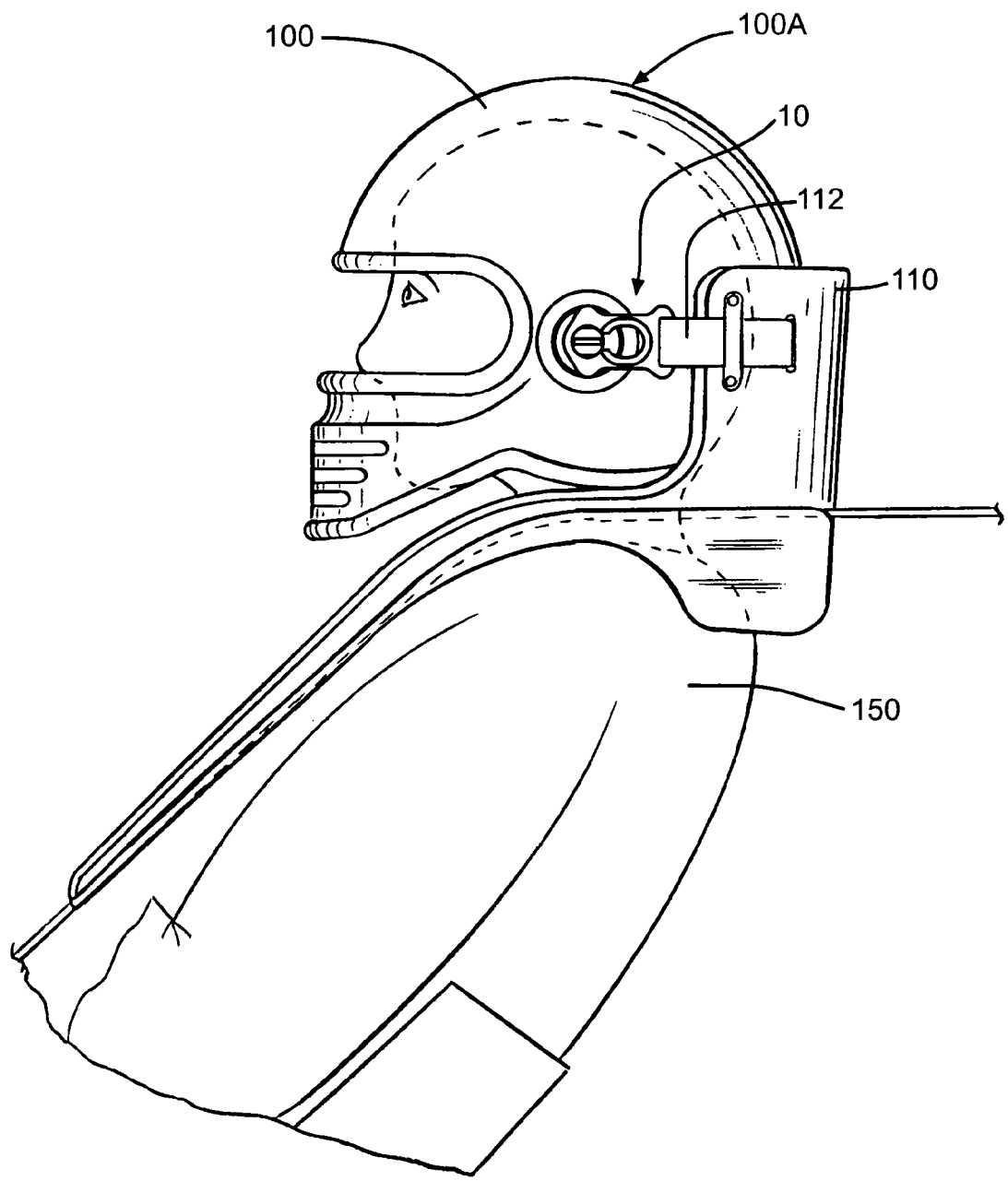
FIG. 1 is a side view showing the post attachment device 10 connecting a helmet 100 worn by a user 150 to a head and neck support device 110 worn by the user 150.

The post attachment device 10, 210 and 510 of the present invention allows for a quick and secure method of connecting a helmet 100 worn by the user 150 or driver to a head and neck support device 110 worn by the user 150 (FIG. 1). The attachment device 10, 210 and 510 includes a post anchor 12, 212 and 512 mounted on the helmet 100 and a catch 26, 226, 326, 426 and 526 for securing to the tether 112 connected to the head and neck support device 110 (FIGS. 3, 10, 19 and 21).

Figure 2:
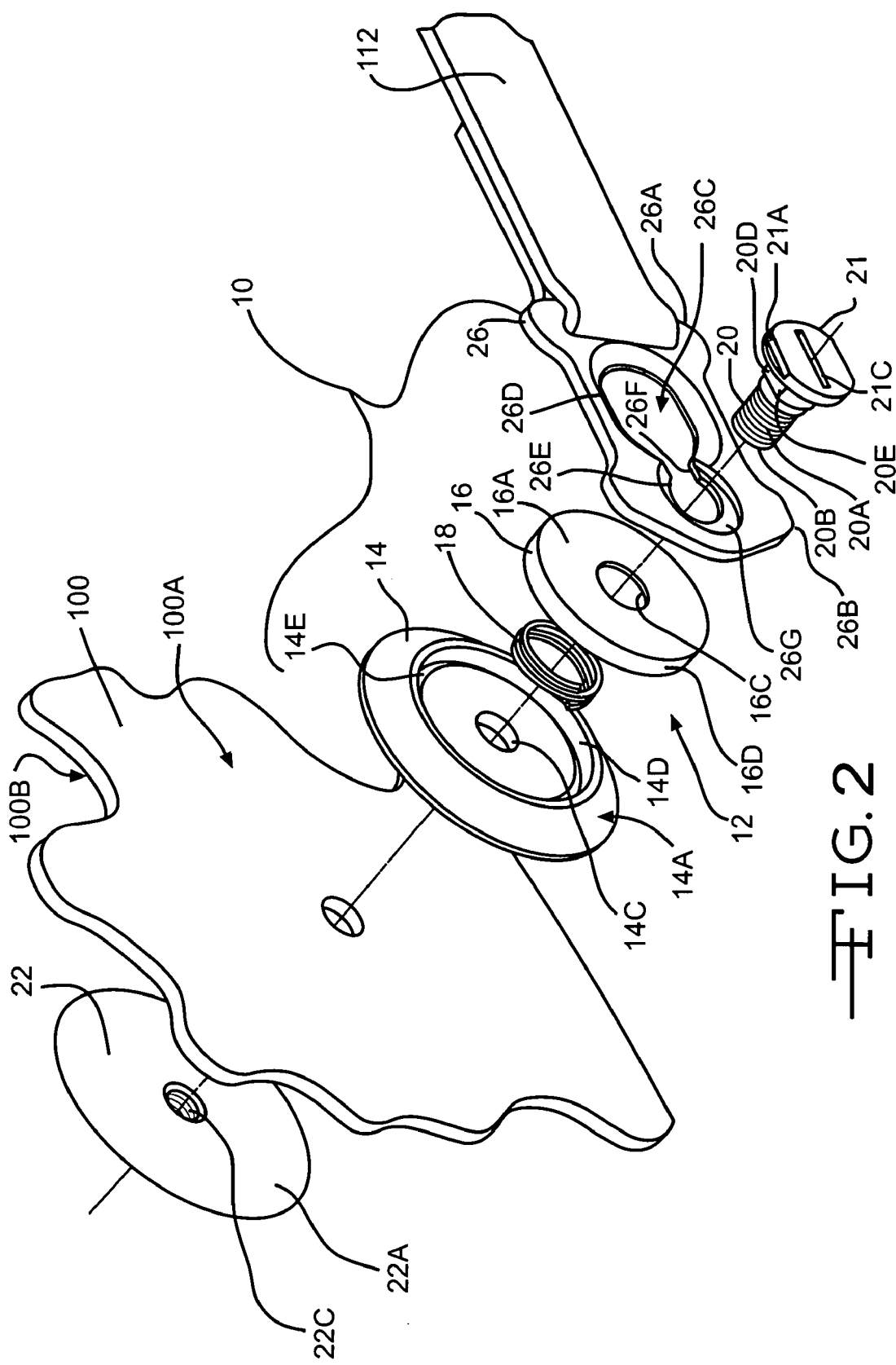
FIG. 2 is an exploded view of the post attachment device 10.

The post anchor 12, 212 and 512 includes a base 14, 214 and 514, a button 16, 216 and 516, a resilient member 18 and 218, a post 20, 220, 320 and 420 and a retainer 22 and 222 (FIGS. 2 and 6). The base 14, 214 and 514 has a front surface 14A, 214A and 514A and a back surface 14B and 214B with a center opening 14C and 214C extending therebetween. In one (1) embodiment, the diameter of the center opening 14C and 214C of the base 14, 214 and 514 is essentially equal to the diameter of the hole in the helmet 100. The back surface 14B and 214B of the base 14, 214 and 514 is curved and smooth to match the curvature of the outer surface 100A of the helmet 100 so that the back surface 14B and 214B of the base 14, 214 and 514 can be mounted flush against the outer surface 100A or skin of the helmet 100. In one (1) embodiment, the back surface 14B and 214B of the base 14, 214 and 514 has a concave curvature. The front surface 14A, 214A and 514A of the base 14, 214 and 514 has an indention or recess 14D, 214D and 514D. In one (1) embodiment, the indention 14D, 214D and 514D is symmetrically positioned around the center opening 14C and 214C of the base 14, 214 and 514. A groove 14E and 214E is provided around the perimeter of the indention 14D, 214D and 514D so that the indention 14D, 214D and 514D has a raised middle portion.

In the fifth embodiment, the base 514 is provided with stops 514F adjacent the indention 514D. The stops 514F are spaced apart approximately 180° around the indention 514D. However, it is understood that the position of one or more of the stops 514F can be changed to adjust the amount of rotation of the catch 526 on the post.

The base 14, 214 and 514 in one (1) embodiment, has a frusto-conical shape. The angled sides of the base 14, 214 and 514 help to reduce damage to the base 14, 214 and 514 and harm to the user.

The button 16, 216 and 516 is mounted in the indention 14D, 214D and 514D of the base 14, 214 and 514 and has a shape similar to the shape of the indention 14D, 214D and 514D. In one (1) embodiment, the indention 14D, 214D and 514D is circular and the button 16, 216 and 516 has a circular cross-section. The button 16, 216 and 516 has an opening 16C and 216C which is aligned with the center opening 14C and 214C of the base 14, 214 and 514 when the button 16, 216 and 516 is positioned in the indention 14D, 214D and 514D of the base 14, 214 and 514. The center opening 14C and 214C of the base 14, 214 and 514 is smaller in diameter to the center opening 16C and 216C of the button 16, 216 and 516. The button 16, 216 and 516 has a front side 16A, 216A and 516A and a back side 16B and 216B with a sidewall 16D and 216D around the perimeter extending outward from the back side 16B and 216B in a direction opposite the front side 16A, 216A and 516A.

Figure 10:
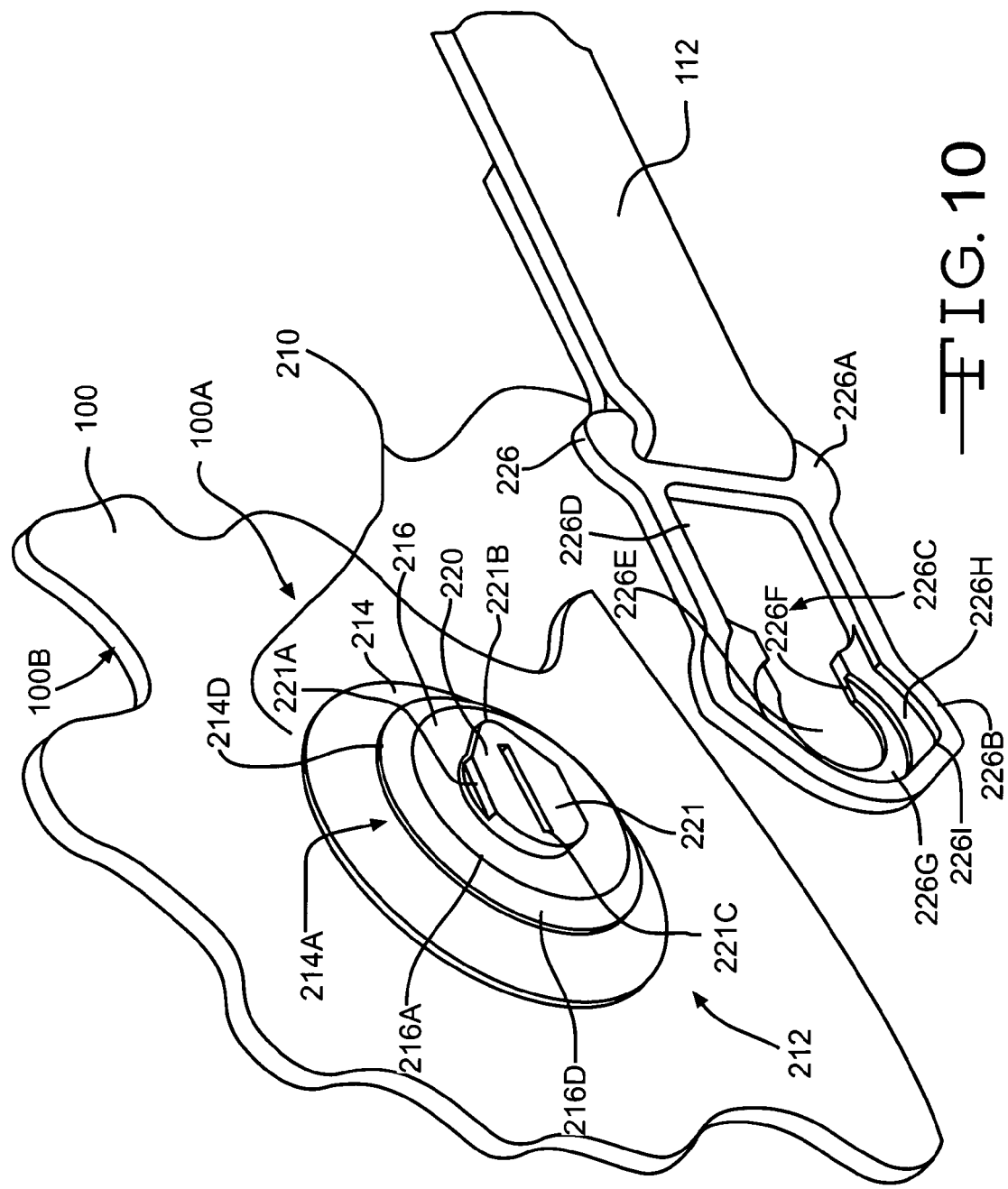
FIG. 10 is a perspective view of the post attachment device 210 of the second embodiment in the disconnected position.
Figure 11:
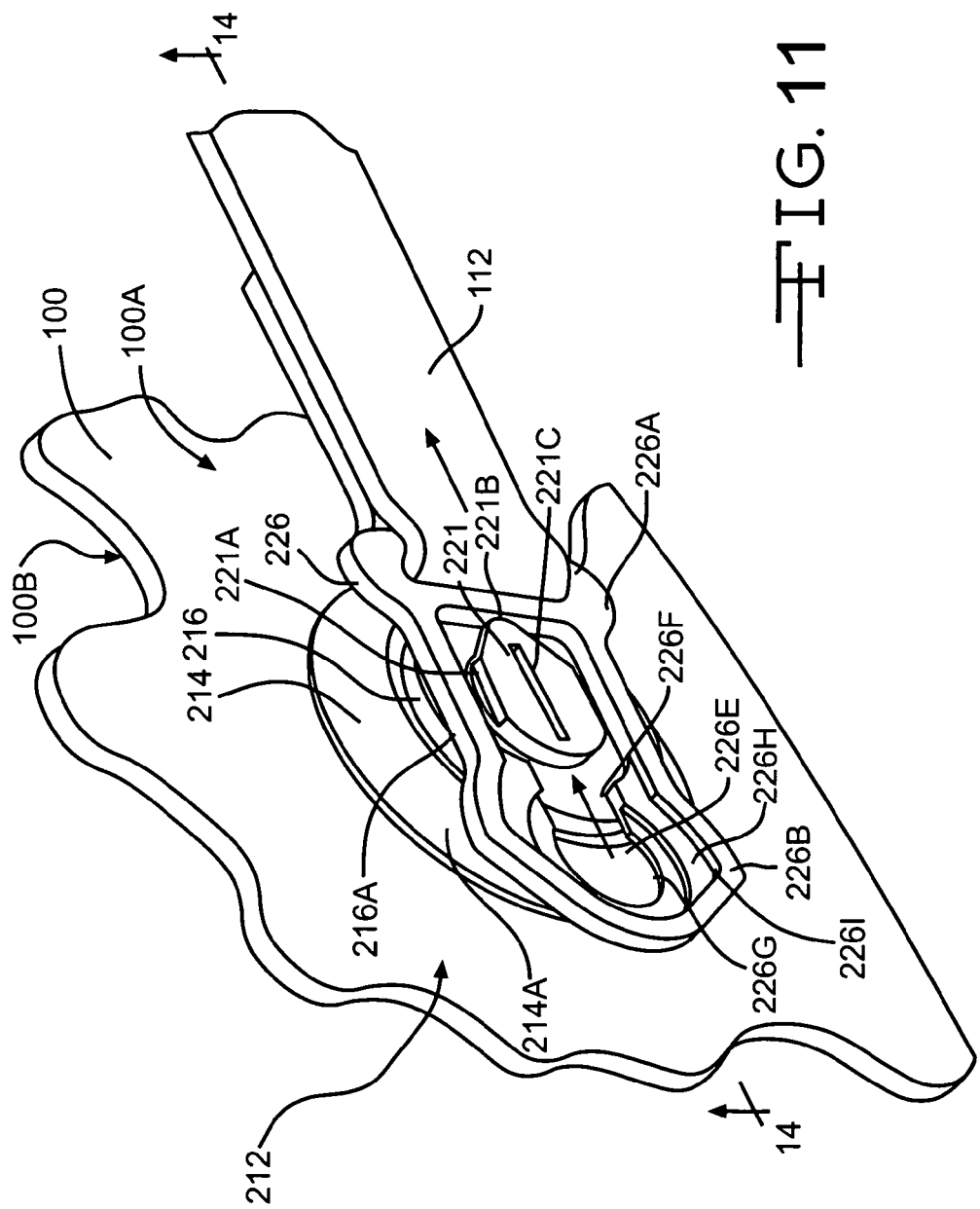
FIG. 11 is a perspective view of the post attachment device 210 of the second embodiment during attachment.
Figure 12:
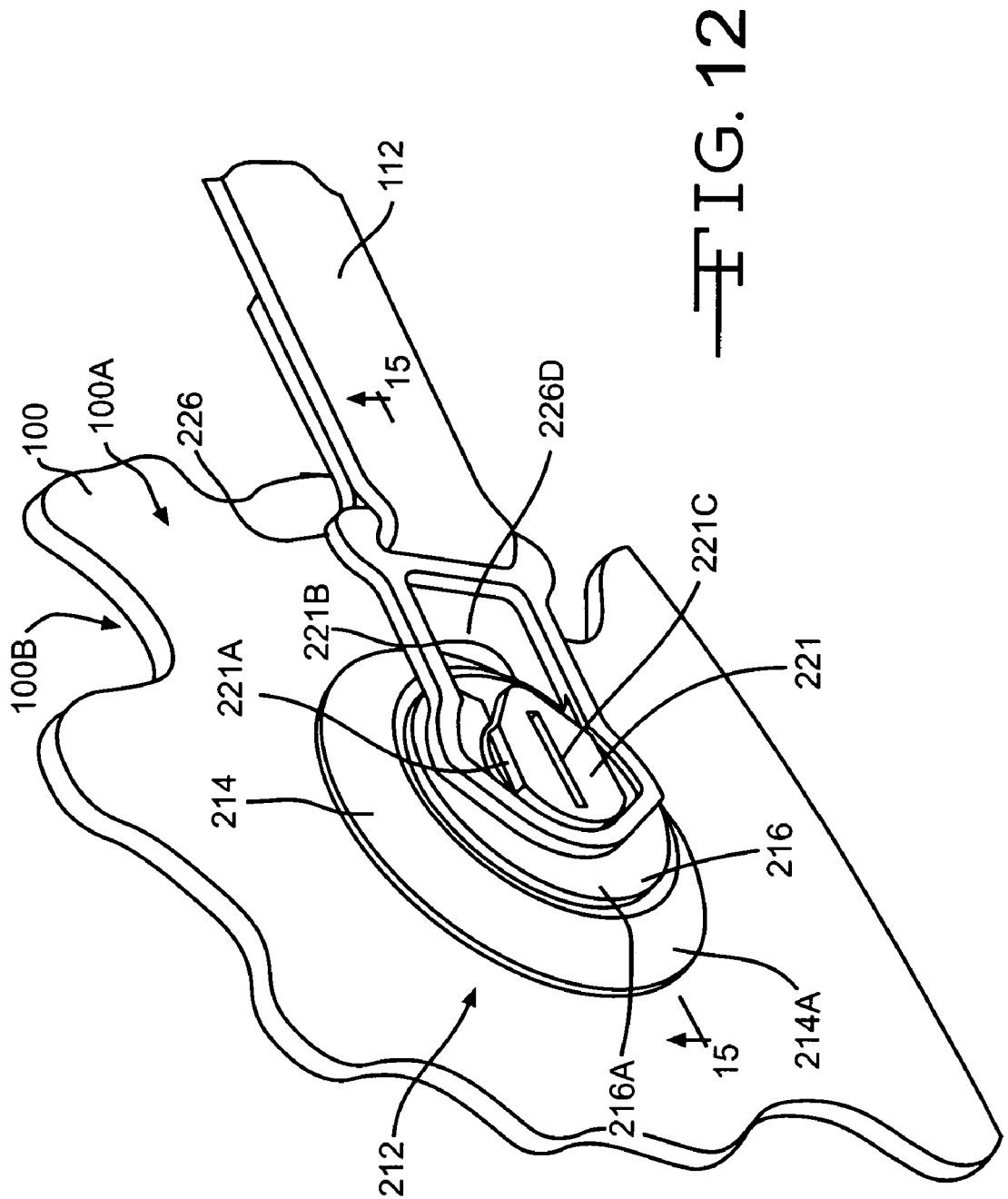
FIG. 12 is a perspective view of the post attachment device 210 of the second embodiment in the fully connected position with the catch 226 in the initial, unrotated position.
Figure 13:
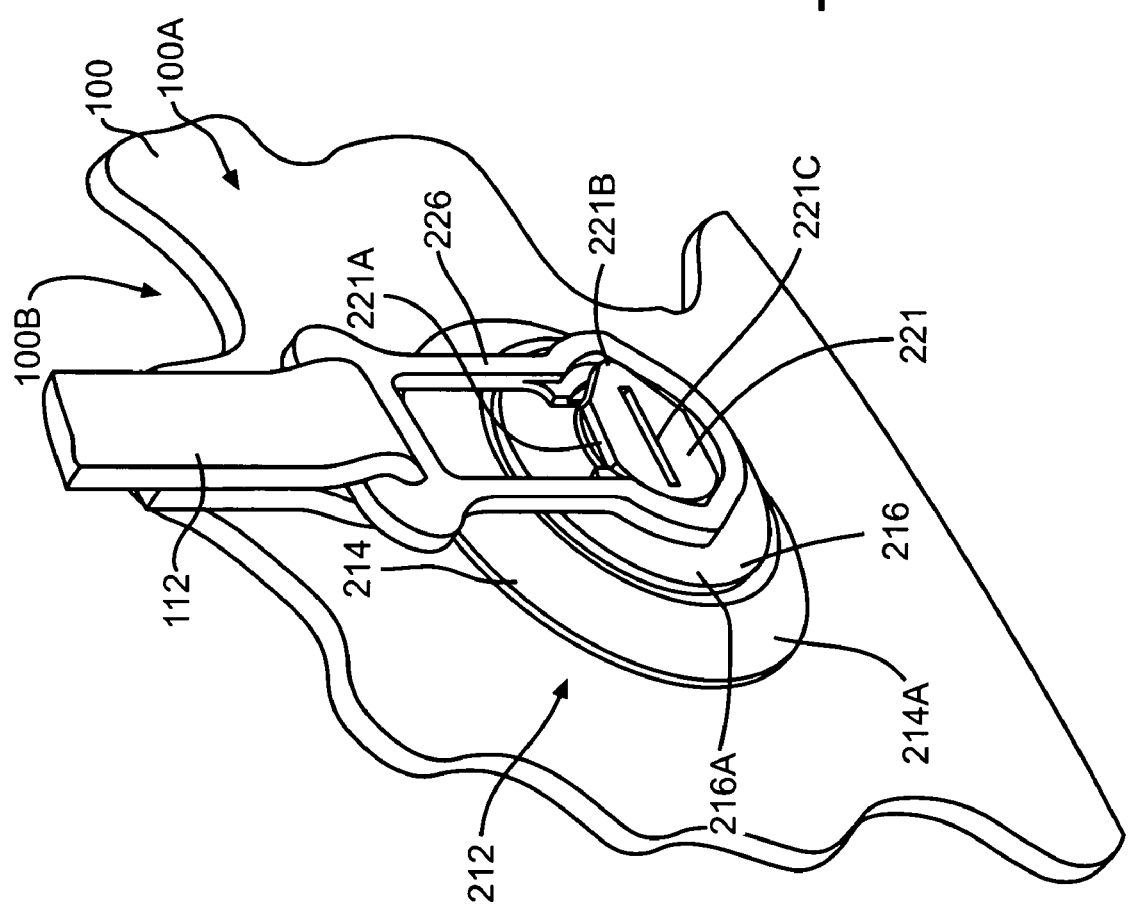
FIG. 13 is a perspective view of the post attachment device 210 of the second embodiment in the fully connected position with the tether 112 and catch 226 rotated around the head 221 of the post in a counterclockwise direction.

In one (1) embodiment as shown in FIG. 10, the sidewall 216D of the button 216 is angled such that the diameter of the button 216 at the top of the sidewall 216D adjacent the head 221 of the post 220 is less than the diameter of the button 216 on the bottom of the sidewall 216D adjacent the base 214.

When the button 16, 216 and 516 is positioned in the indention 14D, 214D and 514D, the sidewall 16D and 216D of the button 16, 216 and 516 extends into the groove 14E and 214E around the perimeter of the indention 14D and 214D (FIGS. 6 to 9 and 14 and 15). In one (1) embodiment, the height of the sidewall 16D and 216D is equal to or less than the depth of the groove 14E and 214E of the indention 14D, 214D and 514D from the front surface 14A, 214A and 514A of the base 14, 214 and 514 to the floor of the groove 14E and 214E and the thickness of the button 16, 216 and 516 between the front and back sides is equal or less than the depth of the indention 14D, 214D and 514D so that the button 16, 216 and 516 can be depressed or pressed inward until the front side 16A, 216A and 516A of the button 16, 216 and 516 is flush with the front surface 14A, 214A and 514A of the base 14, 214 and 514.

A resilient member 18 and 218 is mounted in the indention 14D, 214D and 514D of the base 14, 214 and 514 and extends between the indention 14D, 214D and 514D and the back side 16B and 216B of the button 16, 216 and 516. When the button 16 and 216 is depressed or pressed inward, the resilient member 18 and 218 is compressed. The resilient member 18 and 218 acts to bias the button 16, 216 and 516 out of the indention 14D, 214D and 514D and away from the base 14, 214 and 514. In one (1) embodiment, the resilient member 18 and 218 is a coil spring and is positioned so that the center opening of the coil spring is aligned with the center opening 14C and 214C of the base 14, 214 and 514 and the opening 16C and 216C of the button 16, 216 and 516. It is understood that the resilient member 18 and 218 could be any well known means for biasing the button 16, 216 and 516 away from the base 14, 214 and 514.

Figure 21:
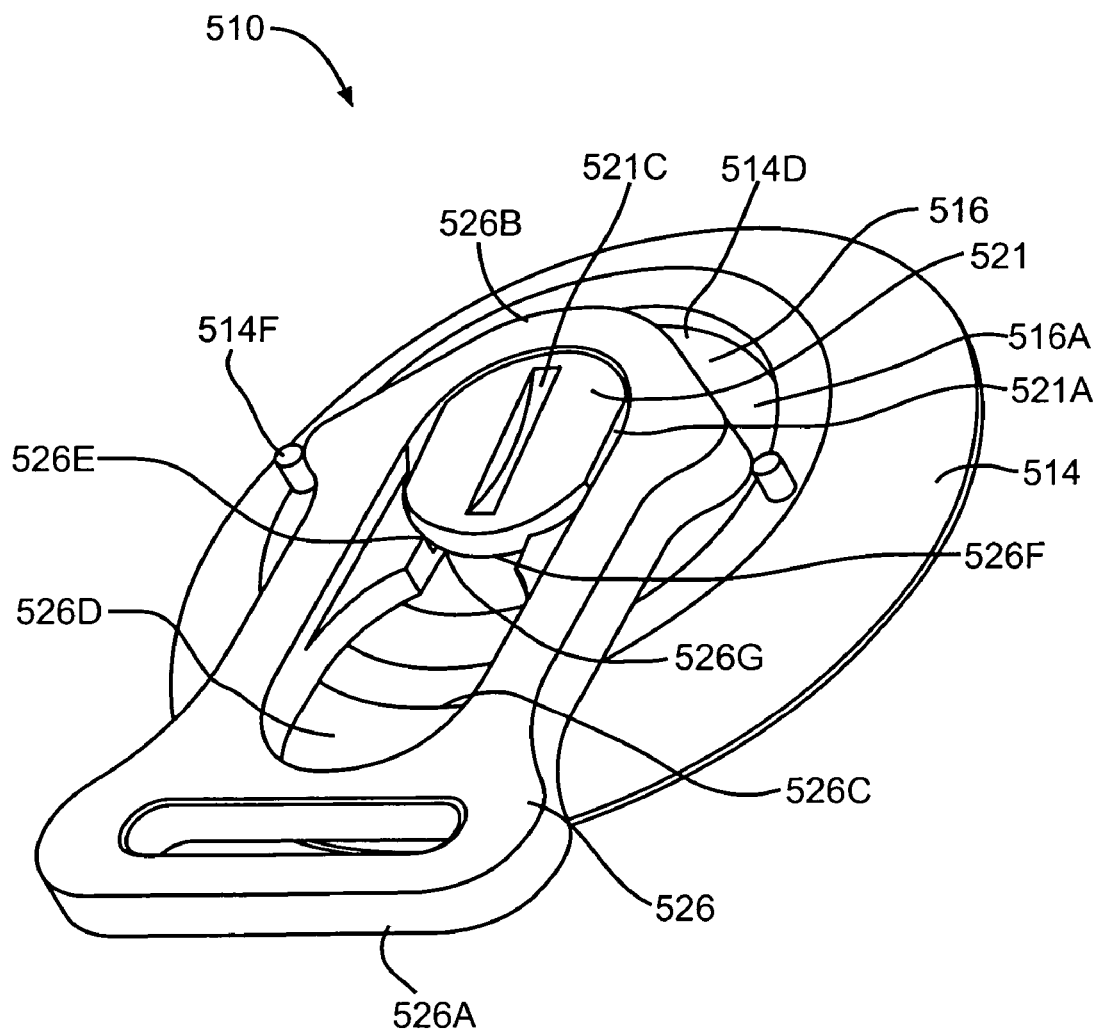
FIG. 21 is a perspective view of the post attachment device 510 of the fifth embodiment with the catch 526 in the initial, unrotated position.
Figure 22:
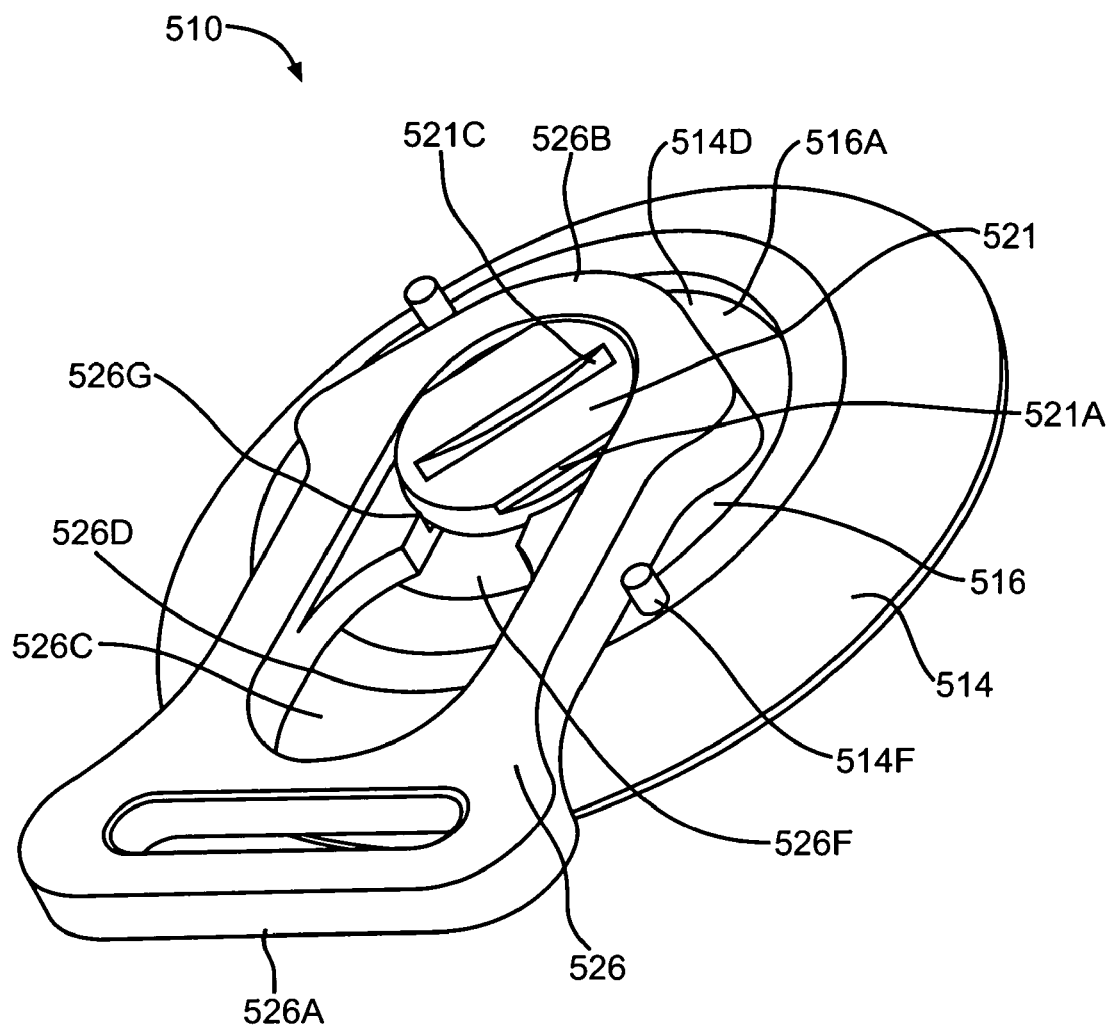
FIG. 22 is a perspective view of the post attachment device 510 of the fifth embodiment with the catch 526 rotated on the post in the counterclockwise direction.
Figure 23:
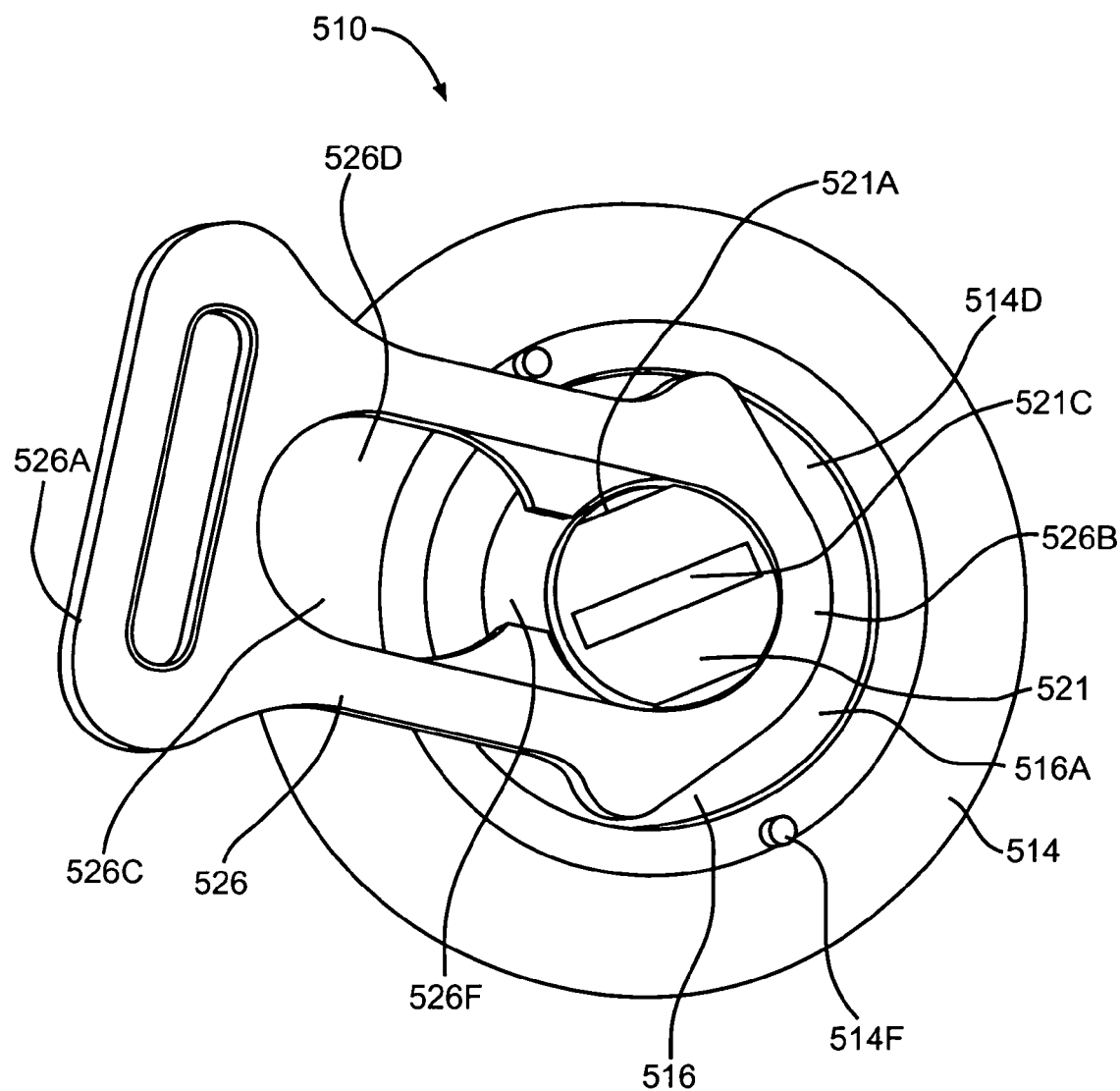
FIG. 23 is a perspective view of the post attachment device 510 of the fifth embodiment with the catch 526 rotated on the post in the clockwise direction.

The post 20, 220, 320 and 420 has a first end 20A, 220A, 320A and 420A and a second end 20B, 220B, 320B and 420B with a head 21, 221, 321, 421 and 521 at the first end 20A, 220A, 320A and 420A. The post 20, 220, 320 and 420 has a connector section 20D and 420D adjacent the head 21, 221, 321, 421 and 521. In the first and fifth embodiments, the head 21 and 521 of the post 20 has an essentially circular shape (FIGS. 3 and 21). In the second, third and fourth embodiments, the head 221, 321 and 421 of the post 220, 320 and 420 has an extension also known as a nose or tail 221B, 321B and 421B. In one (1) embodiment of the second, third and fourth embodiments, the head 221, 321 and 421 has a top portion, a center portion and a bottom portion. The bottom portion has a circular shape and is connected to the connector section 20D and 420D of the post 220, 320 and 420. The center portion is positioned on the top of the bottom portion opposite the connector section 20D and 420D. In one (1) embodiment, the center portion has an essentially circular shape except for parallel and spaced apart flat sections which help form the flats 221A, 321A and 421A of the head 221, 321 and 421. Similarly to the other embodiments, the flat sections 221A, 321A and 421A are parallel to the pair of opposed and parallel flat sections of the connector section 220D and 420D of the post 220, 320 and 420. The top portion is mounted on the top of the center portion opposite the bottom portion. The top portion has a first end and a second end with the flat side sections extending therebetween. The flat side sections are matched with the flat sections of the center section to form the flats 221A, 321A and 421A of the head 221, 321 and 421. In one (1) embodiment, the top surface of the top section opposite the center section is provided with the alignment line 221C, 321C and 421C which extends parallel to the flat sections 221A, 321A and 421A of the head 221, 321 and 421. The first end of the top section has the extension 221B, 321B and 421B which extends out beyond the center and bottom portions. In one (1) embodiment, the first end angles outward from the flat sides of the top portion in the shape of a rounded apex to form the extension 221B, 321B and 421B. In one (1) embodiment, the second end of the top portion is rounded or curved and matches the shape of the circular bottom portion.

The connector section 20D, 220D, 320D and 420D of the post 20, 220, 320 and 420 has a pair of opposed and parallel flat sections or flats 20E. The smallest width of the connector section 20D, 220D, 320D and 420D is between the flat sections 20E. In one (1) embodiment, the connector section 20D, 220D, 320D and 420D has a generally cylindrical shape with curved sections spaced between the flat sections 20E. In this embodiment, the width of the connector section 20D and 220D between the flat sections 20E is less than the width or diameter of the connector section 20D, 220D, 320D and 420D between the curved sections. In one (1) embodiment, the head 21, 221, 321, 421 and 521 of the post 20, 220, 320 and 420 has a pair of opposed and parallel flat sections or flats 21A, 221A, 321A, 421A and 521A which are parallel to the pair of opposed and parallel flat sections 20E of the connector section 20D, 220D, 320D and 420D. In one (1) embodiment, the head 21, 221, 321, 421 and 521 of the post 20, 220, 320 and 420 has a line 21C, 221C, 321C, 421C and 521C which extends between and parallel to the flat sections 21A, 221A, 321A, 421A and 521A of the head 21, 221, 321, 421 and 521 and the flat sections 20E of the connector section 20D, 220D, 320D and 420D. In one (1) embodiment, the line 21C, 221C, 321C, 421C and 521C is a notch which acts as a screwdriver slot.

The post 20, 220, 320 and 420 is of such a size and length as to extend through the openings 16C and 216C of the button 16, 216 and 516 and the base 14, 214 and 514 and through the hole in the helmet 100. In one (1) embodiment, the post 20, 220, 320 and 420 is a bolt having a cylindrical shape with threads extending between the connector section 20D, 220D, 320D and 420D and the second end 20B, 220B, 320B and 420B. The diameter of the post 20, 220, 320 and 420 is less than the diameter of the hole in the helmet 100, the center opening 14C and 214C of the base 14, 214 and 514 and the opening 16C and 216C of the button 16, 216 and 516. The diameter or size of the head 21, 221, 321, 421 and 521 of the post 20, 220, 320 and 420 is greater than the diameter or size of the opening 16C and 216C of the button 16, 216 and 516 so that the post 20, 220, 320 and 420 can not extend completely through the button 16, 216 and 516. The connector section 20D, 220D, 320D and 420D of the post 20, 20, 320 and 420 has a size or diameter greater than the size or diameter of the center opening 14C and 214C of the base 14, 214 and 514 and less than the size or diameter of the opening 16C and 216C of the button 16, 216 and 516 so that the connector section 20D, 220D, 320D and 420D extends through the button 16, 216 and 516 and contacts the front surface 14A, 214A and 514A of the base 14, 214 and 514 around the center opening 14C and 214C of the base 14, 214 and 514.

A retainer 22 and 222 is secured to the second end 20B and 220B of the post 20 and 220 which extends through the hole in the helmet 100 into the interior of the helmet 100. The retainer 22 and 222 has a front surface 22A and 222A and a back surface 22B and 222B with a center opening 22C and 222C extending therebetween. The front surface 22A and 222A of the retainer 22 and 222 is curved and smooth to match the curvature of the inner surfaces 100B of the helmet 100 so that when the retainer 22 and 222 is tightly secured on the second end 20B and 220B of the post 20 and 220, the front surface 22A and 222A of the retainer 22 and 222 is flush against the inner surface 100B of the helmet 100. In one (1) embodiment where the post 20, 220 is threaded, the opening 22C and 222C of the retainer 22 and 222 is threaded to engage the threads of the post 20 and 220. In this embodiment, an extension 24 and 224 is provided around the opening 22C and 222C in the retainer 22 and 222. The extension 24 and 224 has a center bore 24A and 224A which is aligned with the center opening 22C and 222C of the retainer 22 and 222. The center bore 24A and 224A of the extension 24 and 224 is threaded and provides additional contact with the threads of the post 20 and 220. In one (1) embodiment, the outer or perimeter size and shape of the back surface 14B and 214B of the base 14 and 214 is similar to the outer or perimeter size and shape of the front surface 22A and 222A of the retainer 22 and 222. In one (1) embodiment, the base 14 and 214 has a circular shaped back surface 14B and 214B and the retainer 22 and 222 has a circular shaped front surface 22A and 222A. In one (1) embodiment, both the base 14 and 214 and the retainer 22 and 222 have an outer diameter in the range of about 1.00 inch (25.4 mm) to 1.5 inches (38.1 mm).

The catch 26, 226, 326, 426 and 526 has a first end 26A, 226A, 326A, 426A and 526A and a second end 26B, 226B, 326B, 426B and 526B with a slot or opening 26C, 226C, 326C, 426C and 526C extending therebetween. The catch 26, 226, 326, 426 and 526 is connected at the first end 26A, 226A, 326A, 426A and 526A to the head and neck support device 110. In one (1) embodiment, the catch 26, 226, 326, 426 and 526 is connected to the head and neck support device 110 by a tether 112. In one (1) embodiment, the head and neck support device 110 is assembled with tethers 112 having a length of approximately 6 inches (153 mm). In this embodiment, the tether length can be adjusted plus or minus ¾ inch (19 mm) for individual preference. The tether length should be long enough to allow motions of the head and helmet 100 that are actually needed, but no more. Different tether lengths may be desired for different uses. However, it is understood that any well known flexible means of connecting the catch 26, 226, 326, 426 and 526 to the head and neck support device 110 can be used. The slot 26C, 226C, 326C, 426C and 526C of the catch 26, 226, 326, 426 and 526 has a first section 26D, 226D, 326D, 426D and 526D adjacent the first end 26A, 226A, 326A, 426A and 526A and a second section 26E, 226E, 326E, 426E and 526E adjacent the second end 26B, 226B, 326B, 426B and 526B. The first and second sections 26D, 226D, 326D, 426D and 526D and 26E, 226E, 326E, 426E and 526E of the slot 26C, 226C, 326C, 426C and 526C are connected by a channel 26F, 226F, 326F, 426F and 526F. The width of the first section 26D, 226D, 326D, 426D and 526D of the slots 26C, 226C, 326C, 426C and 526C between the sides is greater than a diameter or width of the head 20C, 220C, 320C, 420C and 520C of the post 20, 220, 320 and 420. In one (1) embodiment, the first section 26D, 226D, 326D, 426D and 526D has an oval shape. In one (1) embodiment, the first section 226D of the catch 226 has an essentially rectangular shape. However, it is understood that the first section 26D, 226D, 326D, 426D and 526D of the slot 26C, 226C, 326C, 426C and 526C of the catch 26, 226, 326, 426 and 526 can have a variety of shapes provided the head 21, 221, 321, 421 and 521 of the post 20, 220, 320 and 420 is able to extend through the first section 26D, 226D, 326D, 426D and 526D of the slot 26C, 226C, 326C, 426C and 526C. In the second, third and fourth embodiments, the length of the first section 226D, 326D and 426D of the slot 226C, 326C and 426C between the ends is greater than the length or size of the head 221, 321 and 421 of the post 220, 320 and 420 between the ends including the extension 221B, 321B and 421B. In one (1) embodiment, the perimeter of the first section 26D of the slot 26C on the front surface of the catch 26 is beveled.

The second section 26E, 226E, 326E, 426E and 526E of the slot 26C, 226C, 326C, 426C and 526C has an essentially circular shape with a gap or opening into the channel 26F, 226F, 326F, 426F and 526F. The diameter of the circular section of the second section 26E, 226E, 326E and 426E is slightly greater than the diameter or width of the connector section 20D, 220D, 320D and 420D of the post 20, 220, 320 and 420 such that the catch 26, 226, 326, 426 and 526 is able to rotate on the connector section 20D, 220D, 320D and 420D of the post 20, 220, 320 and 420 once the catch 26, 226, 326, 426 and 526 is fully connected to the post 20, 220, 320 and 420. In one (1) embodiment, the second end of the catch 26, 226, 326, 426 and 526 is rounded and follows the shape of the second section 26E, 226E, 326E, 426E and 526E of the slot. The front surface of the catch 26, 226, 326, 426 and 526 around the perimeter of the second section 26E, 226E, 326E, 426E and 526E is provided with a recess 26G, 226G, 326G, 426G and 526G. The outer perimeter size of the recess 26G, 226G, 326G, 426G and 526G of the second section 26E, 226E, 326E, 426E and 526E is greater than a width or diameter of the second section 26E, 226E, 326E, 426E and 526E and of the channel 26F, 226F, 326F, 426F and 526F. In one (1) embodiment, the recess 26G extends the length of the channel 26F into the second section 26E of the slot 26C. In one (1) embodiment, the recess 226G, 326G, 426G and 526G extends only a portion of the length of the channel 226F, 326F, 426F and 526F. In the first and fifth embodiments, the outer perimeter shape of the recess 26G and 526G is essentially the same shape as the head 21 and 521 of the post 20 without the flat sections 21A and 521A. In the second, third and fourth embodiments where the bottom portion of the head 21, 221, 321 and 421 of the post 220, 320 and 420 has a circular shape, the shape and size of the recess 226G, 326G and 426G is essentially equal to the shape and size of the bottom portion of the head 21, 221, 321 and 421. The diameter of the recess 226G, 326G and 426G is slightly greater than the size of the bottom portion so that the bottom portion fits within the recess 226G, 326G and 426G when the catch 226, 326 and 426 is fully connected to the post 220, 320 and 420. In one (1) embodiment, the depth of the recess 226G, 326G and 426G is essentially equal to the thickness of the bottom portion of the head 221, 321 and 421 such that the bottom portion is flush with the sides of the recess 226G, 326G and 426G when the catch 226, 326 and 426 is fully connected to the post 220, 320 and 420. In one (1) embodiment, the thickness of the catch 226, 326, 426 and 526 and the depth of the second section 226E, 326E, 426E and 526E of the slot 226C, 326C, 426C and 526C from the floor of the recess 226G, 326G and 426G to the top surface of the catch 226, 326, 426 and 526 is essentially equal to the thickness of the head 221, 321, 421 and 521 of the post 220, 320 and 420 so that when the post 220, 320 and 420 is correctly positioned in the second section 226E, 326E, 426E and 526E of the slot 226C, 326C, 426C and 526C, the head 221, 321, 421 and 521 does not extend above the catch 226, 326, 426 and 526. In one (1) embodiment, the top surface of the head 221, 321, 421 and 521 is flush with the top surface of the catch 226, 326 and 426.

In the second embodiment, a portion of the recess 226G in the second section 226E of the slot 226C has a second recess 226H positioned adjacent the channel 226F of the slot 226C. The sides of the catch 226 adjacent the second end 226B of the catch 226 are provided with protrusions 226I which extend beyond the sides of the catch 226 adjacent the first section 226D of the slot 226C. The protrusions 226I allow the second recess 226H around the second section 226E of the slot 226C to have a width or size greater than the width of the first section 226D. The sides of the catch 226 forming the protrusions 226I curve outward at the point where the second section 226E of the slot 226C connects to the channel 226F. The sides of the protrusions 226I angle inward toward the rounded, second end 226B of the catch 226. As the sides angle inward, the second recess 226H disappears. In one (1) embodiment, the angled sides of the protrusions 226I adjacent the rounded second end 226B of the catch 226 are similar to the angle of the sides of the extension 221B of the head 221 of the post 220 between the flats 221A and the first end of the head 221. The size of the second recess 226H of the second section 226E in the side protrusions 226I is greater than the size of the head 221 of the post 220 with the extension 221B.

In the third embodiment, the depth of the recess 326G is essentially equal to the thickness of the bottom and center portions of the head 321 of the post 320 so that the top portion of the head 321 of the post 320 with the extension 321A extends above the top surface of the catch 326.

In the fourth embodiment, the second recess 426H extends around a majority of the perimeter of the second section 426E of the slot 426C except for adjacent each side of the channel 426F.

Figure 17:
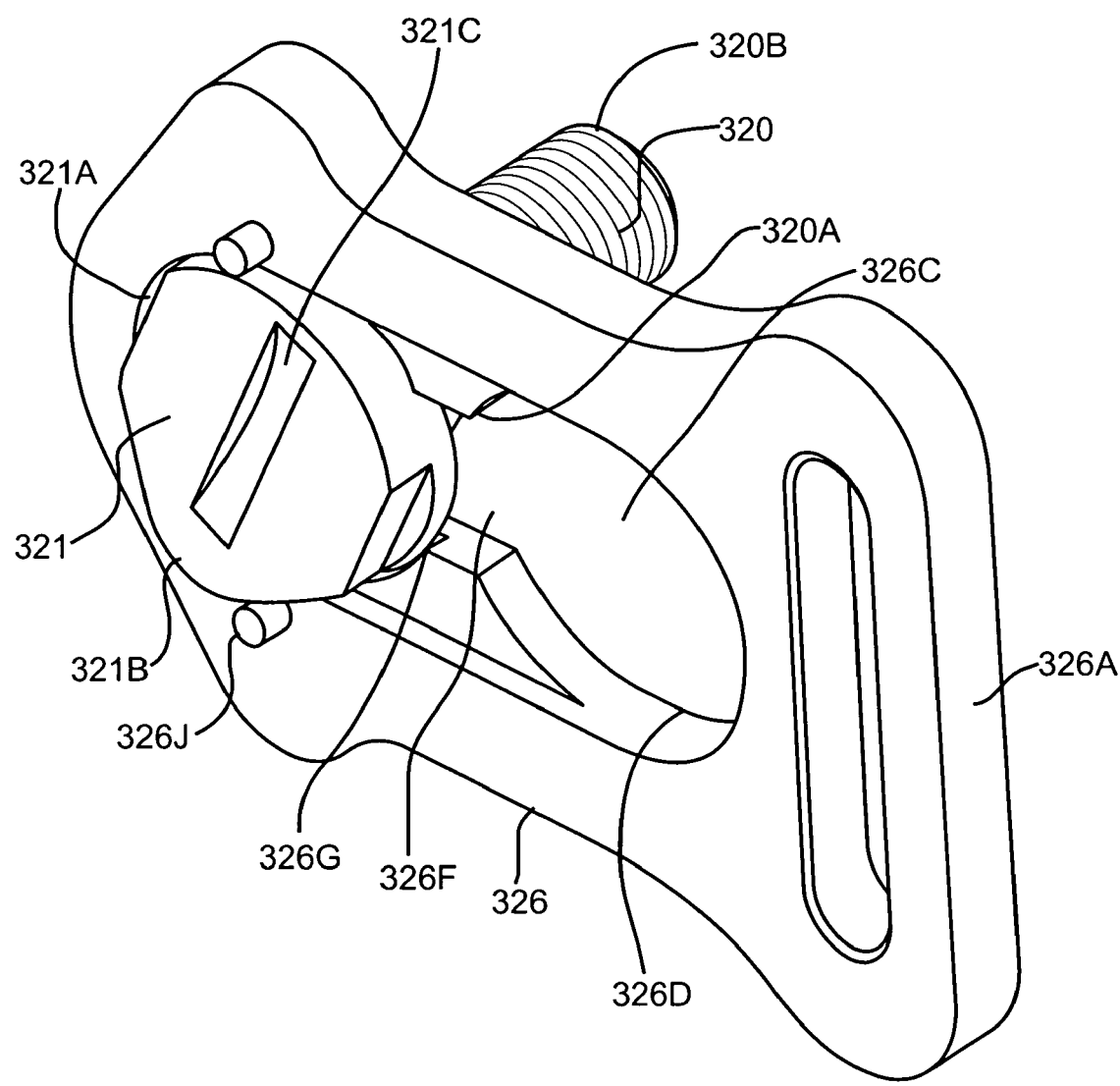
FIG. 17 is a partial view of the catch 326 and post 320 of the third embodiment with the catch 326 rotated in the clockwise direction on the post 320.
Figure 18:
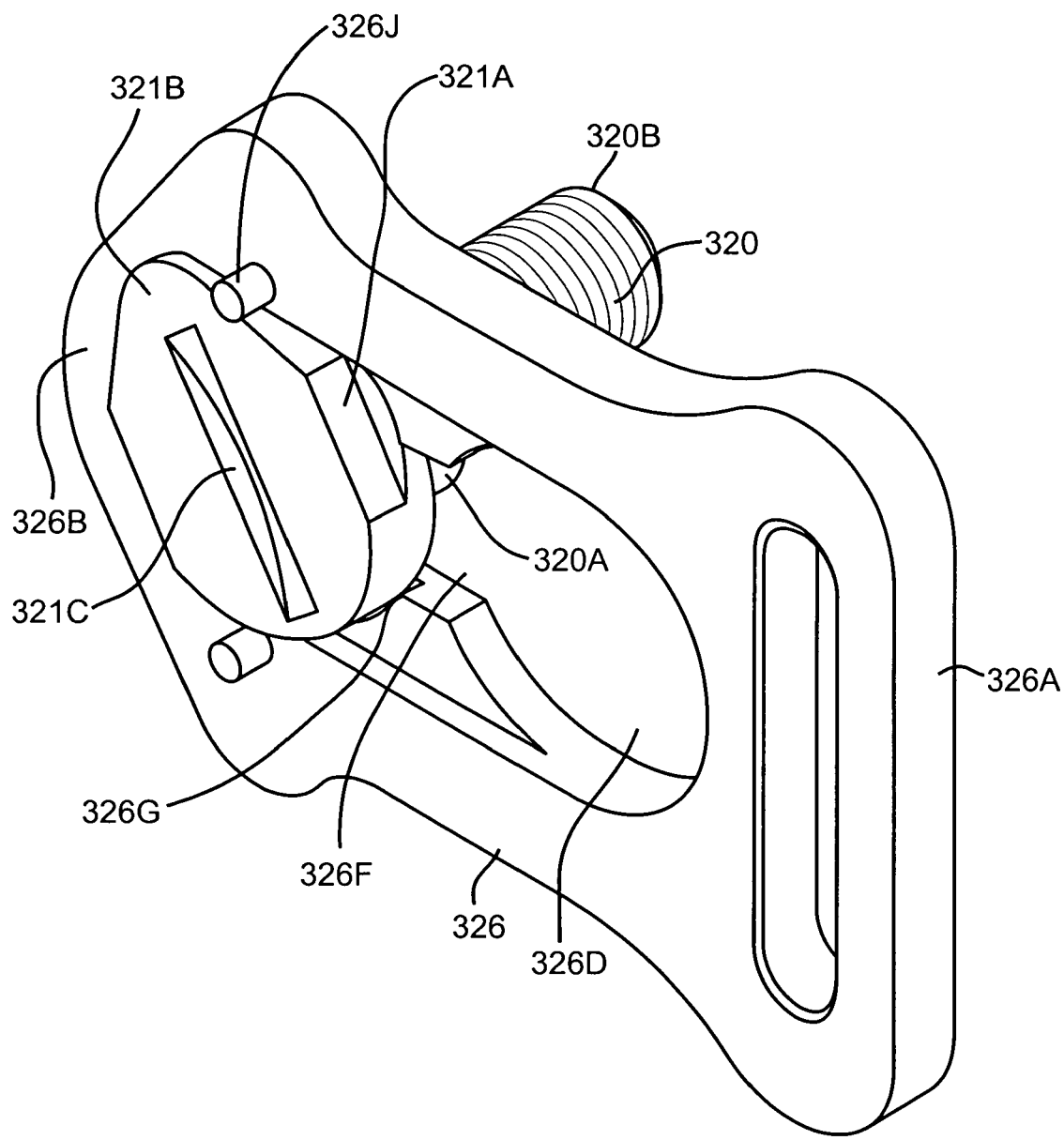
FIG. 18 is a partial view of the catch 326 and post 320 of the third embodiment with the catch 326 rotated on the post 320 in the counterclockwise direction.
Figure 19:
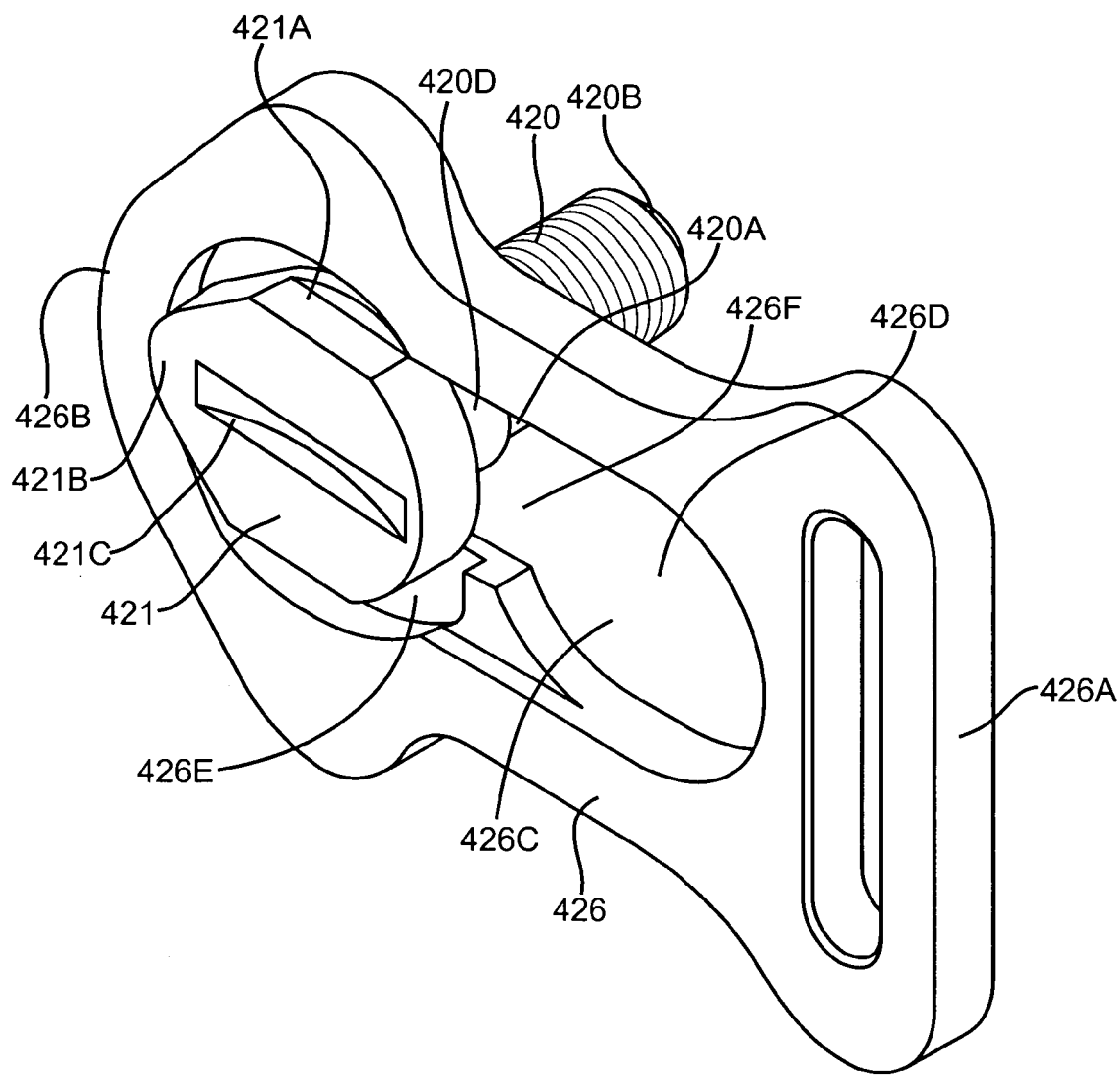
FIG. 19 is a partial perspective view of the catch 426 and the post 420 of the fourth embodiment showing the catch 426 in the initial, unrotated position.
Figure 20:
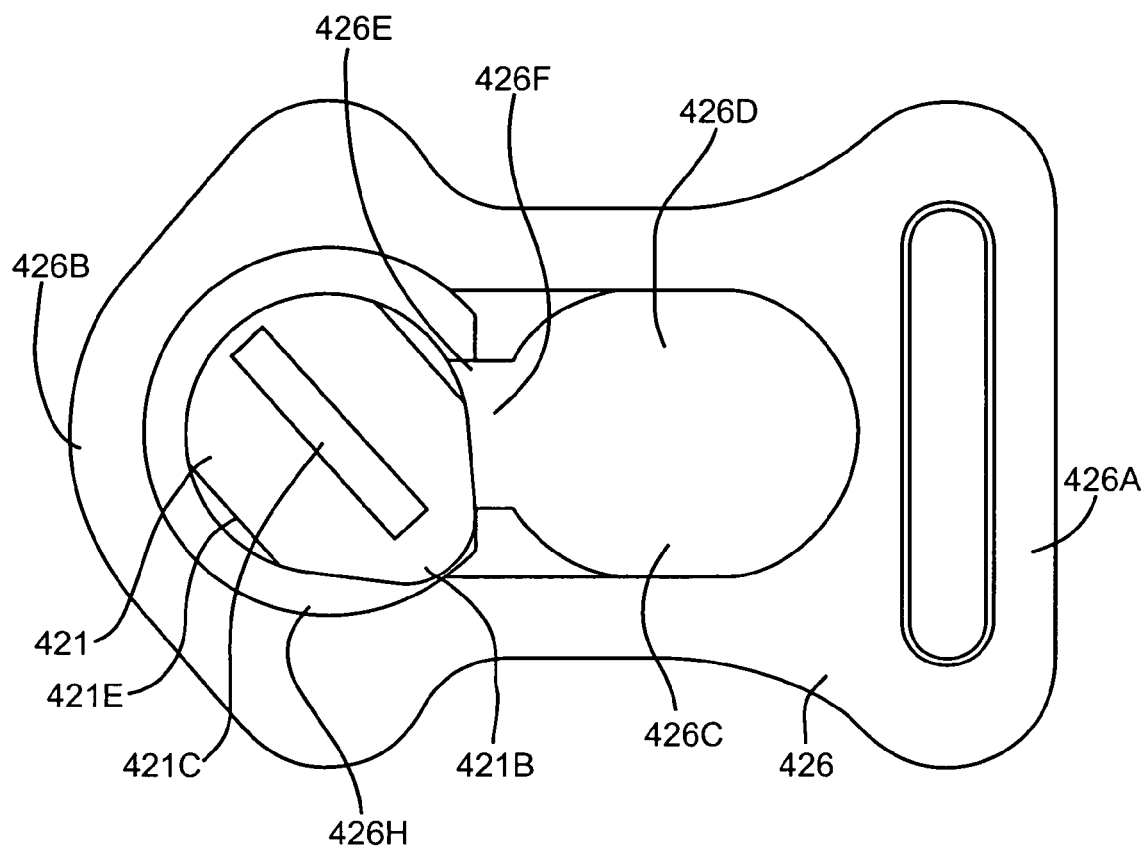
FIG. 20 is a partial view of the catch 426 of the fourth embodiment showing the catch 426 rotated around the head 421 of the post in the clockwise direction.

In the third embodiment, the catch 326 is provided with stops 326J adjacent the second section 326E of the slot 326C (FIG. 17). In one (1) embodiment, the stops 326J are spaced equally between the channel 326F and the end of the second section 320E adjacent the second end 326B of the catch 326.

The channel 26F, 226F, 326F, 426F and 526F of the slot 26C, 226C, 326C, 426C and 526C has an open ended, rectangular shape with a width between the sides less than a width of the first section 26D, 226D, 326D, 426D and 526D or the second section 26E, 226E, 326E, 426E and 526E of the slot 26C, 226C, 326C, 426C and 526C between the sides. The width of the channel 26F, 226F, 326F, 426F and 526F is slightly greater than a width of the connector section 20D, 220D, 320D and 420D of the post 20, 220, 320 and 420 between the flat sections 20E. In one (1) embodiment, each of the sides of the catch 26, 226, 326, 426 and 526 have a straight, flat section which is parallel to the sides of the channel 26F, 226F, 326F, 426F and 526F. In one (1) embodiment, the sides of the catch 26, 226, 326, 426 and 526 adjacent the second section 26E, 226E, 326E, 426E and 526E of the slot 26C, 226C, 326C, 426C and 526C are flared to allow for easier grasping of the catch 26, 226, 326, 426 and 526 and to allow for exerting a force on the catch 26, 226, 326, 426 and 526 into the button 16, 216 and 516.

In one (1) embodiment, the post 20 has an overall length of 0.68 inches (17.27 mm) and a diameter at the second end of approximately 0.25 inches (6.35 mm). The head 21 of the post 20 has a diameter of approximately between 0.4996 to 0.498 inches (12.6898 to 12.6492 mm), and the connector section 20D has a diameter of essentially between 0.307 and 0.312 inches (7.798 to 7.925 mm). The center opening 14C of the base 14 has a diameter of approximately 0.250 to 0.253 inches (6.35 to 6.426 mm). The first section 26D of the slot 26C of the catch 26 has a radius from the center point to the sides of approximately 0.251 to 0.260 inches (6.375 to 6.604 mm), the channel 26F has a width between the sides of approximately 0.255 to 0.265 inches (6.477 to 6.731 mm) and the second section 26E of the slot 26C has a radius of between about 0.160 to 0.168 inches (4.064 to 4.267 mm). The recess 26G around the second section 26E of the slot 26C of the catch 26 has a radius of approximately between 0.253 to 0.256 inches (6.426 to 6.502 mm). In one (1) embodiment, the components of the post attachment device 10, 210 and 510 are constructed of stainless steel.

A pair of post attachment devices 10, 210 and 510 are used to connect the helmet 100 to the head and neck support device 110. The post attachment devices 10, 210 and 510 connect each side of the helmet 100 and the head of the user 150 to the head and neck support device 110 adjacent each of the shoulders of the user 150. The post anchors 12, 212 and 512 are mounted on opposite sides of the helmet 100 and are adjacent the ears (not shown) or sides of the head of the user 150 when the helmet 100 is worn by the user 150. The post anchors 12, 212 and 512 are mounted through holes drilled in the helmet 100.

To position the holes correctly on the helmet 100, a vertical centerline must be drawn on the helmet 100 in the middle of the back of the helmet 100. The post anchors 12, 212 and 512 must be installed symmetrically on each side of the vertical centerline. The vertical centerline is located by measuring the same distance from the left side and the right side of the helmet 100. To draw the centerline, a vertical strip of masking tape is positioned on the back of the helmet 100. The masking tape is applied to the outer surface 100A of the helmet 100 to protect the finish of the helmet 100 while marking for drilling. Next, strips of tape are placed on the left and right sides of the helmet 100 in the areas where the anchor posts 12, 212 and 512 are going to be installed. A horizontal line is then drawn on the tape on the back of the helmet 100 approximately 1.5 inches (38 mm) up from the top of the molding at the bottom edge of the helmet 100. A vertical dash, point or short vertical line is drawn on the masking tape at the back of the helmet 100 at approximately the location of the vertical centerline. The distance from the left side pivot point of the visor or face shield of the helmet 100 to the vertical dash on the back of the helmet 100 is measured. This measurement is used to measure the same distance from the right side pivot point for the visor to the back of the helmet 100. A second vertical dash is drawn at this point. Finally, a vertical line is drawn on the tape halfway between the two (2) vertical dashes. This line is the true centerline.

Next, lines are drawn 1.5 inches (38 mm) from the top of the rubber edge molding at the lower edge of the helmet 100 on the tape on each side of the helmet 100 and at the vertical centerline which creates an intersection point on the true vertical centerline. Next, for standard helmets 100, a distance of 6.0 inches (151 mm) is measured from the intersection point on the true centerline around the helmet 100. A dash is made at this point so as to intersect the horizontal line 1.5 inches (38 mm) from the top of the rubber edge molding of the helmet 100. This will be the center hole of the first post anchor 12, 212 or 512. The same distance is measured on the other side of the helmet 100 to locate the center hole for the second post anchor 12, 212 or 512. For Simpson Sidewinder™ helmets, a distance of 4.75 inches (121 mm) is measured rather than 6.0 inches (151 mm). For Bell™ helmets, where ridges will not allow the base plate to sit flat on the helmet, a distance of 5.25 inches (133 mm) is measured. The tether 112 length must be adjusted according to the position of the post anchors 12, 212 and 512. Finally, the distance between the two (2) marks for the center of the holes is measured to confirm that the holes will be about 12 inches (305 mm) apart, measured on the surface of the helmet 100 and 1.5 inches (38 mm) from the top edge of the molding. In more precise technical terms, the center marks should be on the S4 plane as described in the Snell Standard for Protective Headgear, 90 mm behind the coronal (transverse) plane and separated by approximately 180 to 220 mm (7.1 to 8.7 inches).

Once the center point for the holes is located, the holes are drilled in the left and right sides of the helmet 100. In one (1) embodiment, the holes have a 0.25 inch (6 mm) diameter. The holes are drilled through the helmet shell but not through the padding. Finally, the tape is removed and the holes are deburred.

To assemble the post anchors 12, 212 and 512 on the helmet 100, the post 20, 220, 320 and 420 is inserted through the button 16, 216 and 516, the resilient member 18 and 218, the base 14, 214 and 514 and the hole in the helmet 100. In the second embodiment, the post 220 is positioned in the hole in the helmet 100 such that the extension 221B at the first end of the head 221 of the post 220 is adjacent to or pointing to the back of the helmet 100. In the third and fourth embodiments, the post 320 and 420 is positioned in the hole in the helmet 100 such that the extension 321B and 421B at the first end of the head 321 and 421 of the post 320 and 420 is adjacent to or pointing to the front of the helmet 100. Next, the post 20, 220, 320 and 420 is secured to the retainer 22 and 222 on the inside of the helmet 100. The retainer 22 and 222 must be flush against the inner surface 100B of the helmet 100. The post 20, 220, 320 and 420 is tightened until snug or when all the clearance is gone but there is no additional torque or tightening. When the anchor post 12, 212 and 512 is fully secured on the helmet 100, the connector section 20D, 220D, 320D and 420D of the post 20, 220, 320 and 420 is in contact with the front surface 14A and 214A of the base 14, 214 and 514 around the perimeter of the center hole of the base 14, 214 and 514. After the post 20, 220, 320 and 420 is snug, the post 20, 220, 320 and 420 is tightened or torqued by turning clockwise an additional 0.125 inch (3.2 mm) turn (about 40 to 45 degrees). The flats 21A, 221A, 321A, 421A and 521A and the line 21C, 221C, 321C and 421C of the head 21, 221, 321, 421 and 521, and the flat sections 20E of the connector section 20D, 220D, 320D and 420D of the post 20, 220, 320 and 420 should be parallel to the ground or essentially horizontal after final tightening.

Once the post anchors 12, 212 and 512 are secured to the helmet 100, the helmet 100 can then be connected to the head and neck support device 110. The helmet 100 is secured to the head and neck support device 110 after the helmet 100 and the head and neck support device 110 are secured on the user 150. To attach a tether 112 to the helmet 100, the tether 112 is connected at one end of the head and neck support device 110 and at the other end to the catch 26, 226, 326, 426 and 526.

To secure the catch 26, 226, 326, 426 and 526 to the post anchor 12, 212 and 512, the catch 26, 226, 326, 426 and 526 is placed so that the first section 26D, 226D, 326D, 426D and 526D of the slot 26C, 226C, 326C, 426C and 526C of the catch 26, 226, 326, 426 and 526 is over the head 21, 221, 321, 421 and 521 of the post 20, 220, 320 and 420 of the post anchor 12, 212 and 512 (FIGS. 4 and 6 to 11). The catch 26, 226, 326, 426 and 526 is then aligned so that the sides of the channel 26F, 226F, 326F, 426F and 526F are aligned with the flats 20E of the connector section 20D, 220D, 320D and 420D. When the head 21, 221, 321, 421 and 521 of the post 20, 220, 320 and 420 is provided with flats 21A, 221A, 321A, 421A and 521A or a line 21C, 221C, 321C, 421C and 521C, the user 150 can align the catch 26, 226, 326, 426 and 526 by aligning the sides of the channel 26F, 226F, 326F, 426F and 526F with the flats 21A, 221A, 321A, 421A and 521A of the head 21, 221, 321, 421 and 521 of the post 20, 220, 320 and 420 or by aligning the line 21C, 221C, 321C, 421 and 521 of the head 21, 221, 321, 421 and 521 so that the line 21C, 221C, 321C, 421C and 521C is parallel to and spaced between the sides of the channel 26F, 226F, 326F, 426F and 526F. In one (1) embodiment, the outer perimeter of the catch 26, 226, 326, 426 and 526 has flat sections which are parallel to the sides of the channel 26F, 226F, 326F, 426F and 526F of the slot 26C, 226C, 326C, 426C and 526C. The flat sections of the catch 26, 226, 326, 426 and 526 can be used by the user 150 to align the sides of the channel 26F, 226F, 326F, 426F and 526F with flat sections 20E of the connector section 20D, 220D, 320D and 420D. When the catch 26, 226, 326, 426 and 526 is correctly positioned, the sides of the channel 26F, 226F, 326F, 426F and 526F are essentially horizontal or parallel to ground surface.

Figure 14:
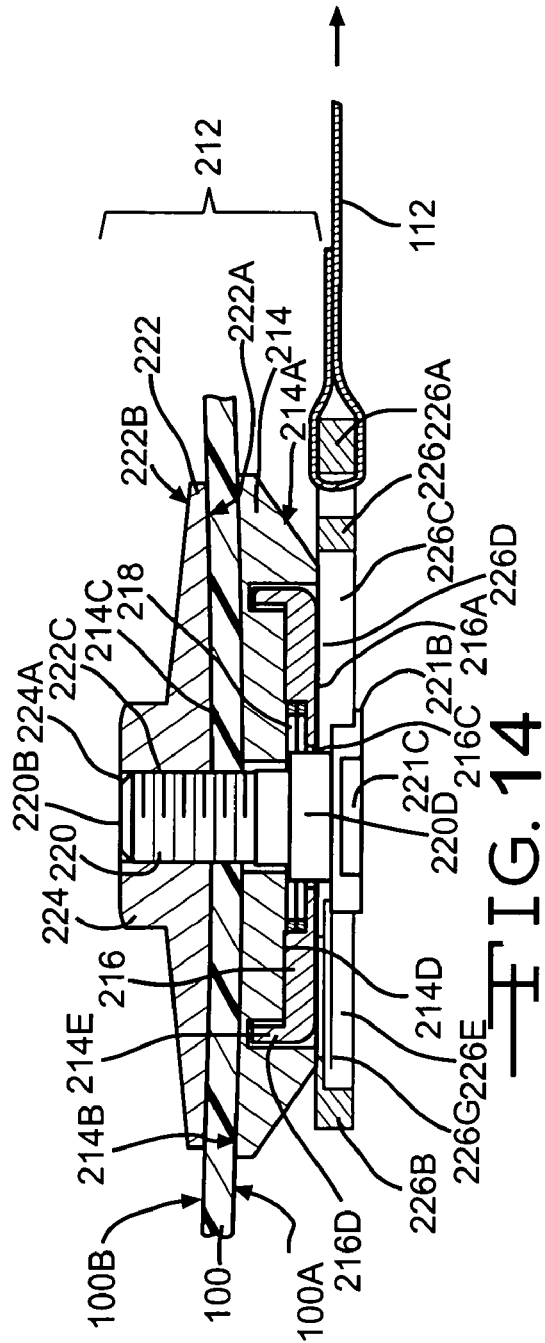
FIG. 14 is a cross-sectional view of FIG. 11 along the line 14-14 showing the button 216 in the pressed position during attachment of the catch 226 to the post 220.

Next, the catch 26, 226, 326, 426 and 526 is pushed inward toward the helmet 100 and is simultaneously moved or slid backwards toward the rear of the helmet 100. The back surface of the catch 26, 226, 326, 426 and 526 is flat and smooth to allow for easily sliding the catch 26, 226, 326, 426 and 526 along the smooth front side 16A, 216A and 516A of the button 16, 216 and 516. In one (1) embodiment, the angled sides of the base 214 and 514 and the angled sides of the button 216 and 516 help guide the catch 226 and 516 and allow for easier positioning of the catch 226 and 526 on the post 220. As the catch 26, 226, 326, 426 and 526 is pushed inward, the back surface of the catch 26, 226, 326, 426 and 526 contacts the front side 16A, 216A and 516A of the button 16, 216 and 516 and depresses the button 16, 216 and 516 or presses the button 16, 216 and 516 inward so that the button 16, 216 and 516 moves toward the helmet 100 (FIGS. 7 and 14). As the button 16, 216 and 516 is pressed, the resilient member 18 and 218 is compressed. The button 16, 216 and 516 is pressed until the connector section 20D, 220D, 320D and 420D of the post 20, 220, 320 and 420 extends beyond the opening 16C and 216C of the button 16, 216 and 516 and the distance between the front side 16A, 216A and 516A of the button 16, 216 and 516 and the back surface of the head 21, 221, 321, 421 and 521 of the post 20, 220, 320 and 420 is greater than the thickness of the catch 26, 226, 326, 426 and 526 (FIG. 8). In one (1) embodiment, the channel 226F, 326F, 426F and 526F extending between the first and second sections 226D, 326D, 426D and 526D and 226E, 326E, 426E and 526E of the slot 226C, 326C, 426C and 526C has a reduced thickness and is recessed from the top surface of the catch 226, 326, 426 and 526. In this embodiment, the button 216 and 516 is pressed inward until the connector section 220D, 320D and 420D of the post 220, 320 and 420 extends beyond the front side 216A of the button 216 a distance greater than the thickness of the channel 226F, 326F, 426F and 526F of the slot 226C, 326C, 426C and 526C. In this position, in one (1) embodiment, the front side 16A, 216A and 516A of the button 16, 216 and 516 is flush with the front surface 14A of the base 14, 214 and 514 and the back surface of the catch 26, 226, 326, 426 and 526 is in contact with the base 14, 214 and 514. In the embodiment where the button 216 and 516 has angled sides, only the front side 216A and 516A of the button 216 and 516 remains outside the indention and flush with the top of the base 14, 214 and 514, when the button 216 and 516 is pressed inward to allow the catch 226 and 526 to be connected to the post 20 and 220.

Figure 15:
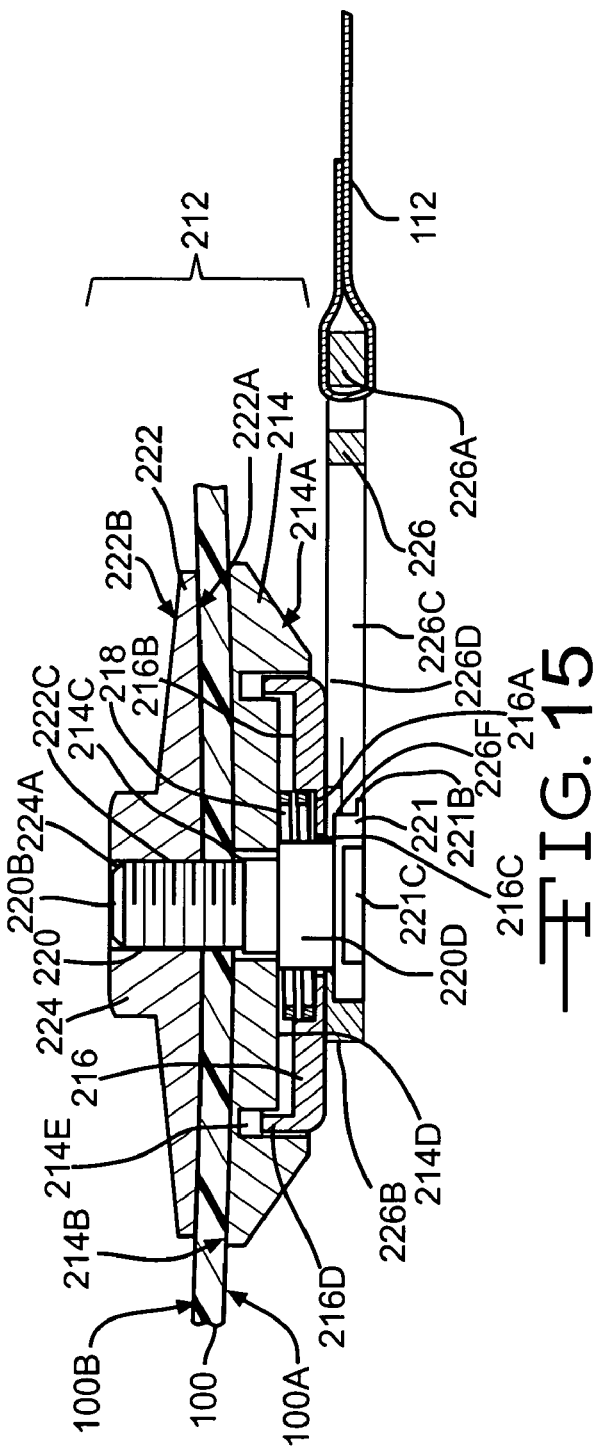
FIG. 15 is a cross-sectional view of FIG. 12 along the line 15-15 showing the button 216 in the partially pressed position with the catch 226 connected to the post 220.
Figure 16:
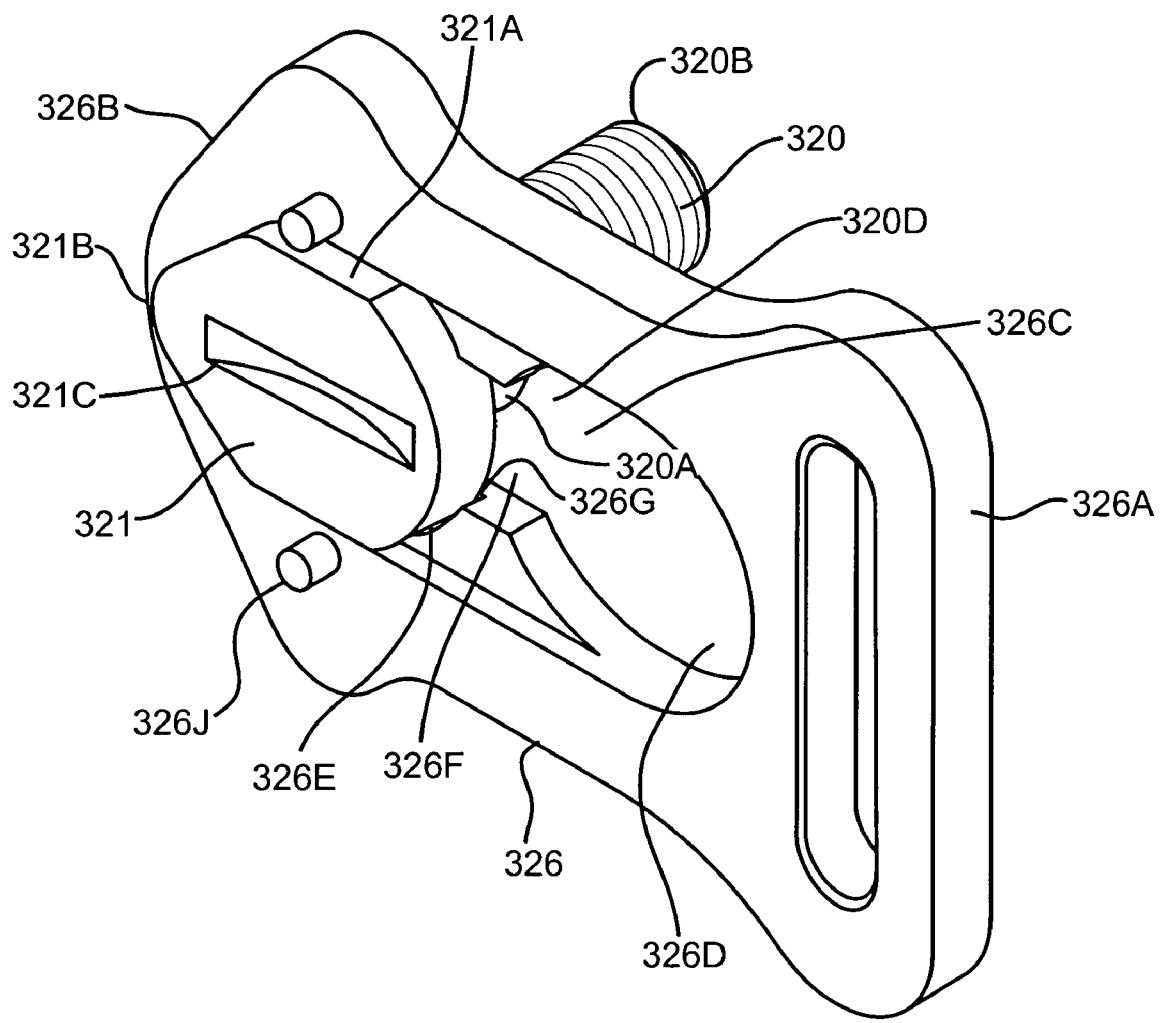
FIG. 16 is a partial view of the post attachment device of the third embodiment showing the catch 326 and the post 320 with the catch 326 in the initial, unrotated position.

When the button 16, 216, 316, 416 and 516 is in the depressed or pressed position, the catch 26, 226, 326, 426 and 526 is moved backwards so that the connector section 20D, 220D, 320D and 420D of the post 20, 220, 320 and 420 moves along the channel 26F, 226F, 326F, 426F and 526F and the post 20, 220, 320 and 420 is moved from the larger first section 26D, 226D, 326D, 426D and 526D of the slot 26C, 226D, 326C, 426C and 526C to the smaller second section 26E, 226E, 326E, 426E and 526E of the slot 26C, 226C, 326C, 426C and 526C. When the post 20, 220, 320 and 420 is fully within the second section 26E, 226E, 326E, 426E and 526E of the slot 26C, 226C, 326C, 426C and 526C of the catch 26, 226, 326, 426 and 526, the pressure on the catch 26, 226, 326, 426 and 526 is released so that the resilient member 18 and 218 expands and moves the button 16, 216 and 516 toward the catch 26, 226, 326, 426 and 526. In one (1) embodiment, when the catch 26, 226, 326, 426 and 526 is fully connected to the post 20, 220, 320 and 420, the button 16, 216 and 516 is slightly pressed inward (FIGS. 9 and 15). In the fully attached position, the head 21, 221, 321, 421 and 521 of the post 20, 220, 320 and 420 is in the recess 26G, 226G, 326G, 426G and 526G around the second section 26E, 226E, 326E, 426E and 526E of the slot 26C, 226C, 326C, 426C and 526C (FIGS. 5 and 9). In this position, the catch 26, 226, 326, 426 and 526 around the second section 26E, 226E, 326E, 426E and 526E of the slot 26C, 226C, 326C, 426C and 526C is sandwiched and held in position between the back surface of the head 21, 221, 321, 421 and 521 of the post 20, 220, 320 and 420 and front side 16A, 216A and 516A of the button 16, 216 and 516. To ensure that the post 20, 220, 320 and 420 is fully within the second section 26E, 226E, 326E, 426E and 526E of the slot 26C, 226C, 326C, 426C and 526C and the catch 26, 226, 326, 426 and 526 is fully secured to the post anchor 12, 212, 312, 412 and 512, the tethers 112 can be pulled toward the back of the helmet 100.

During the initial connection of the catch 26, 226, 326, 426 and 526, the catch 26, 226, 326, 426 and 526 is essentially horizontal with the tether 112 extending toward the back of the helmet 100. The shape and size of the connector section 20D, 220D, 320D and 420D of the post 20, 220, 320 and 420 and the shape and size of the second section 26E, 226E, 326E, 426E and 526E of the slot 26C, 226C, 326C, 426C and 526C of the catch 26, 226, 326, 426 and 526 enable the catch 26, 226, 326, 426 and 526 to easily and smoothly rotate on the post 20, 220, 320 and 420. In one (1) embodiment, the second section 26E, 226E, 326E, 426E and 526E has a generally circular shape with an opening to the channel 26F, 226F, 326F, 426F and 526F and the connector section 20D, 220D, 320D and 420D has an essentially circular or cylindrical shape with parallel and opposed flat sections 20E. As the tether 112 moves and rotates the catch 226, 326, 426 and 526, the post 220, 320 and 420 remains stationary. In one (1) embodiment, the catch 26 is able to freely rotate around the post 20. In one (1) embodiment, when the catch 26, 226, 326, 426 and 526 is correctly secured to the anchor post 12, 212 and 512, the catch 26, 226, 326, 426 and 526 and tether 112 are able to rotate approximately 180° about the post 20, 220, 320 and 420. In another embodiment, the catch 26, 226, 326, 426 and 526 is able to rotate up to approximately 180° about the post 20, 220, 320 and 420. In the second, third, fourth and fifth embodiments, the degree of rotation of the catch 226, 326, 426 and 526 on the post 220, 320 and 420 is limited. Limiting the degree of rotation of the catch 226, 326, 426 and 526 on the post 220, 320 and 420 reduces the twisting of the tether 112 and allows for easier removal of the catch 226, 326, 426 and 526 from the post 220, 320 and 420. In the second and fourth embodiments, the shape of the head 221 and 421 and the second recess 226G and 426G of the second section 226E and 426E of the slot 226C and 426C of the catch 226 and 426 prevent full 360° rotation of the catch 226 and 426 on the post 220 and 420.

In the second embodiment, the catch 226 is able to rotate until the extension 221F at the first end of the head 221 of the post 220 is in one of the protrusions 226I of the slot 226C and the extension 221F contacts the side of the catch 226 where the second recess 226G ends. The protrusions 226I allow the catch 226 to rotate a preset angle in each direction but the angled sides of the second section 226E prevent the catch 226 from rotating beyond the preset angle. The catch 226 is able to rotate approximately 180° on the post 220 or about 90° on either side of the initial position when the sides of the channel 226F of the slot 226C are aligned with the flats of the connector section 220D of the post 220. The similar shape of the sides of the extension 221F of the head 221 and the sides of the protrusions 226I of the catch 226 allows for contact along the entire side of the extension 221F of the head 221 and allows for firmer stopping of the rotation of the catch 226 on the post 220.

In the third embodiment, the catch 326 is able to rotate approximately 180° until the extension 321F on the first end of the head 321 on the post 320 of the post 320 contacts the stops 326J on the top surface of the catch 326. In the fourth embodiment, the catch 426 is able to rotate almost a full 360° on the post 420. In the fifth embodiment, the catch 526 is able to rotate approximately 180° until the sides of the catch 526 contact the stops 514F on the base 514 of the post anchor 512.

In one (1) embodiment, where the degree of rotation of the catch 226, 326 and 426 on the post 220, 320 and 420 is limited, the catch 226, 326 and 426 can be rotated beyond the preset maximum degree of rotation when a torque or force above a predetermined amount is applied to the tether 112. Thus, under situations where a force or torque above a standard or normal amount is applied to the catch 226, 326 and 426, the catch 226, 326 and 426 will be able to rotate on the post 320, 420 and 520. When above normal torque or force is applied to the catch 226, 326 and 426, the catch 226, 326 and 426 presses down on the button 216 which creates a greater distance between the head 221, 321 and 421 of the post 220, 320 and 420 and the button 216. When the distance between the button 216 and the head 221, 321 and 421 of the post 220, 320 and 420 is greater than the thickness of the catch 226, 326 and 426, then the catch 226, 326 and 426 is able to freely rotate between the head 221, 321 and 421 and the button 216 around the post 220, 320 and 420.

Above normal torque or force could be applied to the tether 112 during normal use or during an accident. In one (1) instance, above normal torque or force can be applied to the catch 226, 326 and 426 causing rotation on the post 320, 420 and 520 beyond the standard degree of rotation when the head of the user is pivoted downward in a nodding position. The ability of the catch to rotate beyond the limited degree of rotation is a safety feature which prevents the catch 226, 326 and 426 from locking at a certain angle and allows for freer movement of the user's head.

To remove the catch 26, 226, 326, 426 and 526 from the post anchor 12, 212 and 512, the catch 26, 226, 326, 426 and 526 is aligned so that the flats 20E of the connector section 20D, 220D, 320D and 420D are aligned with the sides of the channel 26F, 226F, 326F, 426F and 526F of the slot 26, 226C, 326C, 426C and 526C of the catch 26, 226, 326, 426 and 526. The catch 26, 226, 326, 426 and 526 is then pressed inward toward the helmet 100 to press the button 16, 216 and 516 inward. While pressing the button 16, 216 and 516, the catch 26, 226, 326, 426 and 526 is slid forward so that the connector section 20D, 220D, 320D and 420D of the post 20, 220, 320 and 420 moves along the channel 26F, 226F, 326F, 426F and 526F from the second section 26E, 226E, 326E, 426E and 526E to the first section 26D, 226D, 326D, 426D and 526D.

The dimensions and tolerances of the base 14, 214 and 514, button 16, 216 and 516 and post 20, 220, 320 and 420 are not dependent on the helmet 100 or its dimensions. When correctly secured on the helmet 100, the tightening of the post 20 and 220 and the retainer 22 and 222 clamps and secures the anchor post 12, 212 and 512 on the helmet 100 between the base 14, 214 and 514 and the retainer 22 and 222. Due to the size or outer dimensions of the base 14, 214 and 514 and the retainer 22 and 222, the base 14, 214 and 514 and the retainer 22 and 222 act to disperse any loads such as tension, shear or torque applied by the tether 112 to the helmet 100 to a larger area of the helmet 100 rather than merely around the smaller hole in the helmet 100. The use of the larger contact area creates a more robust and stronger attachment.

It is intended that the foregoing description be only illustrative of the present invention and that the present invention be limited only by the hereinafter appended claims.

We claim:

1. An attachment device for connecting a head and neck support device to a helmet, which comprises:
    (a) a base having a front surface and a back surface for positioning on the helmet with the back surface of the base adjacent the helmet;
    (b) a button positioned adjacent the front surface of the base;
    (c) a resilient member positioned between the front surface of the base and the button for biasing the button in a direction away from the base;
    (d) a post having opposed first and second ends with a head at the first end and mounted through the button, the base and the helmet so that the head of the post is adjacent the button, the head of the post having an extension; and
    (e) a catch for connecting to the head and neck support device having an opening for connecting to the post by positioning the head of the post in the opening wherein the extension of the head of the post contacts the catch to limit a degree of rotation of the catch on the post.

2. The device of claim 1 wherein the front surface of the base has an indention, wherein the button has a front surface and a back surface and is positioned in the indention with the back surface adjacent the base, and wherein when the button is pressed to attach the catch, the front surface of the button is flush with the front surface of the base adjacent the indention.

3. The device of claim 1 wherein the opening of the catch has a first section and a second section, wherein a width of the first section is greater than a width of the second section and greater than a width of the head of the post wherein the width of the second section is less than the width of the head of the post wherein the post has a connector section adjacent the head, wherein a width of the connector section is less than the width of the head of the post and wherein the width of the connector section is less than the width of the second section of the opening of the catch so that the connector section is able to slide into the second section of the opening of the catch and the catch is able to rotate on the connector section of the post.

4. The device of claim 3 wherein a channel having parallel sides connects the first section of the opening of the catch to the second section of the opening of the catch, the channel having a width between the sides less than a width of the first section and less than a width of the second section, wherein the connector section of the post has a pair of opposed and parallel flat sections, and wherein the width of the channel is greater than a width of the connector section between the flat sections so that the connector section can be moved between the first and second sections of the opening through the channel.

5. The device of claim 3 wherein a recess extends around a portion of a perimeter of the second section of the opening, and wherein a size of the recess is greater than a size of the head of the post to allow the head to extend into the recess when the post is in the second section of the opening and the catch is connected to the post.

6. The device of claim 1 wherein the catch has stops adjacent the opening, wherein when the catch is connected to the head of the post, the head of the post extends beyond the opening and a front surface of the catch and wherein the extension of the head of the post contacts the stops to limit the degree of rotation of the catch on the post.

7. The device of claim 1 wherein the opening of the catch has a first section and a second section, wherein a width of the first section is greater than a width of the second section, wherein the catch has a first recess extending around at least a portion of a perimeter of the second section of the opening, wherein a depth of the first recess from a front surface of the catch is greater than a thickness of the head so that when the catch is connected to the head of the post with the head of the post in the second section of the opening, the head of the post does not extend out of the opening beyond the front surface of the catch.

8. The device of claim 7 wherein the head of the post has a top portion, a center portion and a bottom portion, wherein the bottom portion of the head is adjacent the first end of the post, and the extension is located on the top portion of the head, wherein a shape and size of the first recess are similar to a shape and size of the bottom portion of the head of the post so that when the catch is connected to the post, the bottom portion of the head of the post fits within the first recess of the second section of the opening of the catch.

9. The device of claim 1 wherein the second section of the opening is provided with a first recess and a second recess, wherein a depth of the first recess is greater than a depth of the second recess from a front surface of the catch and wherein when the catch is connected to the post and the catch is rotated on the post, the extension on the head of the post extends into the second recess and contacts a side of the catch adjacent the second recess to limit rotation of the catch on the post.

10. The device of claim 1 wherein the catch is able to rotate less than 180° around the post.

11. The device of claim 1 wherein the catch is able to rotate approximately 180° around the post.

12. The device of claim 1 wherein the second section of the opening of the catch is provided with protrusions.

13. The device of claim 12 wherein the protrusions are of a size such that when the catch rotates on the post, the extension of the head extends into one of the protrusions to allow limited rotation of the catch on the post and wherein the extension of the head contacts the catch adjacent an end of the protrusion to limit rotation of the catch on the post.

14. The attachment device of claim 1 wherein the extension of the head of the post and the catch are configured to enable unlimited rotation of the catch on the post when a torque greater than a predetermined amount is applied to rotate the catch.

15. An attachment device for connecting a head and neck support device to a helmet, which comprises:
 (a) a base having a front surface and a back surface for positioning on the helmet with the back surface of the base adjacent the helmet, the front surface having two spaced apart stops;
 (b) a button positioned adjacent the front surface of the base;
 (c) a resilient member positioned between the front surface of the base and the button for biasing the button in a direction away from the base;
 (d) a post having opposed first and second ends with a head at the first end and mounted through the button, the base and the helmet so that the head of the post is adjacent the button; and
 (e) a catch for connecting to the head and neck support device having an opening for connecting to the post by positioning the head of the post in the opening, wherein when the catch is connected to the head of the post, the catch upon rotation directly between the stops contacts alternating one of the stops on the base to limit a degree of rotation of the catch on the post.

16. The device of claim 15 wherein the front surface of the base has an indention, wherein the button has a front surface and a back surface and is positioned in the indention with the back surface adjacent the base and wherein when the button is pressed to attach the catch, the front surface of the button is flush with the front surface of the base adjacent the indention.

17. The device of claim 15 wherein the opening of the catch has a first section and a second section, wherein a width of the first section is greater than a width of the second section and greater than a width of the head of the post wherein the width of the second section is less than the width of the head of the post wherein the post has a connector section adjacent the head, wherein a width of the connector section is less than the width of the head of the post and wherein the width of the connector section is less than the width of the second section of the opening of the catch so that the connector section is able to slide into the second section of the opening of the catch and the catch is able to rotate on the connector section of the post.

18. The device of claim 17 wherein a channel having parallel sides connects the first section of the opening of the catch to the second section of the opening of the catch, the channel having a width between the sides less than a width of the first section and less than a width of the second section, wherein the connector section of the post has a pair of opposed and parallel flat sections, and wherein the width of the channel is greater than a width of the connector section between the flat sections so that the connector section can be moved between the first and second sections of the opening through the channel.

19. The device of claim 17 wherein a recess extends around a portion of a perimeter of the second section of the opening, and wherein a size of the recess is greater than a size of the head of the post to allow the head to extend into the recess when the post is in the second section of the opening and the catch is connected to the post.

20. The device of claim 15 wherein the catch is able to rotate less than 180° around the post.

21. A method for attaching a head and neck support device to a helmet, which comprises the steps of:
 (a) providing a base having a front surface and a back surface for positioning on the helmet with the back surface of the base adjacent the helmet; a button positioned adjacent the front surface of the base; a resilient member positioned between the front surface of the base and the button for biasing the button in a direction away from the base; and a post having opposed first and second ends with a head at the first end and mounted through the button, the base and the helmet so that the head of the post is adjacent the button, the head of the post having an extension;
 (b) providing a catch having an opening with a first section and a second section, the first section having a width greater than a width of the second section, wherein the catch is connected to the head and neck support device;
 (c) positioning the catch so that the head of the post is adjacent the first section of the opening of the catch;
 (d) pressing the button of the post attachment so that the button moves toward the helmet and the head of the post is spaced apart from the button;
 (e) sliding the catch toward a back of the helmet until the post is in the second section of the catch;
 (f) releasing the button so that the resilient member moves the button toward the catch so that a portion of the catch around a perimeter of the second section of the opening of the catch is spaced between and in contact with the button and the head of the post; and
 (g) rotating the catch on the post so that the extension of the head of the post contacts the catch to limit a degree of rotation of the catch on the post.

22. The method of claim 21 wherein the post has a connector section adjacent the head, the connector section having a pair of opposed and parallel flat sections, wherein the first and second sections of the opening of the catch are connected together by a channel having opposed and parallel sides, wherein in step (c), the catch is positioned so that the sides of the channel are parallel to the flat sections of the connector section and wherein in step (d), the button is pressed until the connector section of the post extends beyond the opening of the button.

23. The method of claim 21 wherein the front surface of the base has an indention, wherein the button has a front surface and a back surface and is positioned in the indention with the back surface adjacent the base, and wherein in step (d), the button is pressed into the indention until the front surface of the button is flush with the front surface of the base.

24. The method of claim 21 wherein in step (g), the catch is able to rotate approximately 180° around the post.

25. The method of claim 21 wherein in step (g), a torque above a predetermined amount is applied to rotate the catch, wherein the catch presses on the button so that the button moves toward the helmet and wherein the catch is able to rotate without limitation on the post.

* * * * *

UNITED STATES PATENT AND TRADEMARK OFFICE
CERTIFICATE OF CORRECTION

PATENT NO. : 7,234,210 B2 Page 1 of 1
APPLICATION NO. : 11/121448
DATED : June 26, 2007
INVENTOR(S) : Mark A. Stiles et al.

It is certified that error appears in the above-identified patent and that said Letters Patent is hereby corrected as shown below:

Column 8, line 52, "post 20, 20, 320" should be --post 20, 220, 320--.

Column 15, line 8, "26C, 226D, 326C" should be --26C, 226C, 326C--.

Signed and Sealed this

Fourth Day of December, 2007

JON W. DUDAS
*Director of the United States Patent and Trademark Office*